(12) United States Patent
Garrish et al.

(10) Patent No.: US 11,488,086 B2
(45) Date of Patent: Nov. 1, 2022

(54) USER INTERFACE AND UNDERLYING DATA ANALYTICS FOR CUSTOMER SUCCESS MANAGEMENT

(71) Applicant: ServiceSource International, Inc., San Francisco, CA (US)

(72) Inventors: John Garrish, Belmont, CA (US); Nelson Chen, Atherton, CA (US); Elaine Scott, San Francisco, CA (US); Jeff Goldsmith, Oakland, CA (US); John Jerrehian, San Francisco, CA (US); Jim Dunham, San Carlos, CA (US); Gabe Richman, San Francisco, CA (US)

(73) Assignee: ServiceSource International, Inc., San Francisco, CA (US)

(*) Notice: Subject to any disclaimer, the term of this patent is extended or adjusted under 35 U.S.C. 154(b) by 1082 days.

(21) Appl. No.: 14/882,381

(22) Filed: Oct. 13, 2015

(65) Prior Publication Data
US 2016/0189082 A1 Jun. 30, 2016

Related U.S. Application Data

(60) Provisional application No. 62/063,349, filed on Oct. 13, 2014.

(51) Int. Cl.
*G06Q 10/06* (2012.01)
*G06Q 30/00* (2012.01)

(52) U.S. Cl.
CPC ....... *G06Q 10/06393* (2013.01); *G06Q 30/01* (2013.01)

(58) Field of Classification Search
None
See application file for complete search history.

(56) References Cited

U.S. PATENT DOCUMENTS 4,354,225 A 10/1982 Frieder et al.
4,527,237 A 7/1985 Frieder et al.
(Continued)

FOREIGN PATENT DOCUMENTS

JP H06119309 A 4/1994
JP H09044331 A 2/1997
(Continued)

OTHER PUBLICATIONS

ServiceSource helps cloud and subscription businesses create customers for life with customer lifecycle management. (Jun. 17, 2014). Business Wire Retrieved from https://dialog.proquest.com/professional/docview/1536062362?accountid=131444 (Year: 2014).*
(Continued)

*Primary Examiner* — Folashade Anderson
(74) *Attorney, Agent, or Firm* — Sheridan Ross P.C.

(57) ABSTRACT

Approaches relating to customer service management for recurring revenue assets are described. A CSM application or other CSM software tool (or set of tools) can include features relating to customer lifecycles, product usage, and/or customer success, each of which can be monitored based on various analytical measures, metrics, indicators, etc. provided by one or more analytical engines. Systems, methods, computer program products, and the like are described.

17 Claims, 22 Drawing Sheets

(56) References Cited

U.S. PATENT DOCUMENTS

| | | |
|---|---|---|
| 5,530,863 A | 6/1996 | Hino |
| 5,550,734 A | 8/1996 | Tarter et al. |
| 5,704,044 A | 12/1997 | Tarter et al. |
| 6,131,085 A | 10/2000 | Rossides |
| 6,473,794 B1 | 10/2002 | Guheen et al. |
| 6,721,713 B1 | 4/2004 | Guheen et al. |
| 7,191,183 B1 | 3/2007 | Goldstein |
| 7,315,826 B1 | 1/2008 | Guheen et al. |
| 7,425,700 B2 | 9/2008 | Stults et al. |
| 8,001,013 B2 | 8/2011 | Serbanescu |
| 8,010,404 B1 | 8/2011 | Wu et al. |
| 8,046,295 B1 | 10/2011 | Cohan |
| 8,046,362 B1 | 10/2011 | Bayliss |
| 8,140,381 B1 | 3/2012 | Wu et al. |
| 8,176,083 B2 | 5/2012 | Vossen et al. |
| 8,200,527 B1* | 6/2012 | Thompson ............ G06Q 30/00 705/7.41 |
| 8,204,809 B1 | 6/2012 | Wise |
| 8,515,796 B1* | 8/2013 | Rajan ............ G06Q 10/06393 705/7.11 |
| 8,612,582 B2 | 12/2013 | Dare et al. |
| 8,793,753 B2 | 7/2014 | Bhogal et al. |
| 8,825,513 B1* | 9/2014 | Misra ............ G06Q 10/0635 705/7.28 |
| 8,832,424 B1* | 9/2014 | Milman ............ G06Q 30/01 709/220 |
| 8,843,385 B2 | 9/2014 | Jurca et al. |
| 9,037,964 B2* | 5/2015 | Appleyard ............ G06F 16/26 715/234 |
| 10,178,080 B1* | 1/2019 | Khanna ............ G06Q 10/0875 |
| 10,331,302 B1* | 6/2019 | Leyden ............ G06F 3/0362 |
| 2001/0013030 A1 | 8/2001 | Colby et al. |
| 2002/0065752 A1 | 5/2002 | Lewis |
| 2002/0065879 A1 | 5/2002 | Ambrose et al. |
| 2002/0091539 A1 | 7/2002 | Yin et al. |
| 2002/0128938 A1 | 9/2002 | Ronald Schofield et al. |
| 2002/0147726 A1 | 10/2002 | Yehia et al. |
| 2002/0147815 A1 | 10/2002 | Tormasov et al. |
| 2002/0169777 A1 | 11/2002 | Balajel et al. |
| 2003/0036683 A1 | 2/2003 | Kehr et al. |
| 2004/0006506 A1 | 1/2004 | Hoang |
| 2004/0034699 A1 | 2/2004 | Gotz et al. |
| 2004/0107125 A1 | 6/2004 | Guheen et al. |
| 2004/0167789 A1 | 8/2004 | Roberts et al. |
| 2004/0172374 A1 | 9/2004 | Forman |
| 2004/0220790 A1 | 11/2004 | Cullick et al. |
| 2005/0096950 A1 | 5/2005 | Caplan et al. |
| 2005/0096963 A1 | 5/2005 | Myr et al. |
| 2005/0108043 A1 | 5/2005 | Davidson |
| 2005/0279824 A1 | 12/2005 | Anderson et al. |
| 2006/0059054 A1 | 3/2006 | Adiseshan |
| 2006/0070013 A1* | 3/2006 | Vignet ................ G06F 16/972 715/854 |
| 2007/0067297 A1 | 3/2007 | Kublickis |
| 2007/0091874 A1 | 4/2007 | Rockel et al. |
| 2007/0156673 A1* | 7/2007 | Maga ............ G06Q 30/02 |
| 2007/0185867 A1* | 8/2007 | Maga ............ G06F 16/24 |
| 2007/0243887 A1 | 10/2007 | Bandhole et al. |
| 2007/0265904 A1 | 11/2007 | Lindquist et al. |
| 2008/0071561 A1 | 3/2008 | Holcombe |
| 2008/0133324 A1 | 6/2008 | Jackson et al. |
| 2008/0154625 A1 | 6/2008 | Serbanescu |
| 2008/0270256 A1 | 10/2008 | Caballero et al. |
| 2008/0288889 A1 | 11/2008 | Hunt et al. |
| 2009/0024543 A1 | 1/2009 | Horowitz et al. |
| 2009/0163183 A1 | 6/2009 | O'Donoghue |
| 2009/0234710 A1* | 9/2009 | Belgaied Hassine .. G06Q 30/02 705/7.29 |
| 2009/0240551 A1 | 9/2009 | Writz et al. |
| 2009/0240586 A1 | 9/2009 | Ramer et al. |
| 2009/0307074 A1* | 12/2009 | Sharma ............ G06Q 30/0224 705/14.25 |
| 2010/0010967 A1 | 1/2010 | Muller |
| 2010/0088155 A1 | 4/2010 | Pyle et al. |
| 2010/0121830 A1 | 5/2010 | Berry et al. |
| 2010/0218104 A1 | 8/2010 | Lewis |
| 2010/0318451 A1 | 12/2010 | Niccolini et al. |
| 2011/0214090 A1* | 9/2011 | Yee ............ G06Q 10/10 715/838 |
| 2011/0238948 A1 | 9/2011 | Vorbach et al. |
| 2011/0246254 A1 | 10/2011 | Johnson et al. |
| 2011/0246873 A1* | 10/2011 | Tolle ............ G06T 11/001 715/255 |
| 2011/0295722 A1 | 12/2011 | Reisman |
| 2012/0032945 A1* | 2/2012 | Dare ............ G06F 3/0481 345/418 |
| 2012/0197686 A1 | 8/2012 | Abu El Ata |
| 2012/0324373 A1* | 12/2012 | Halliday ............ G06Q 10/10 715/759 |
| 2013/0024342 A1 | 1/2013 | Horowitz et al. |
| 2013/0035992 A1 | 2/2013 | Silverman |
| 2013/0054306 A1* | 2/2013 | Bhalla ............ G06Q 30/02 705/7.31 |
| 2013/0104206 A1* | 4/2013 | Waghmare ............ H04M 15/70 726/6 |
| 2013/0211986 A1 | 8/2013 | DeBie et al. |
| 2013/0268437 A1 | 10/2013 | Desai et al. |
| 2013/0335419 A1* | 12/2013 | Bondesen ............ G06T 11/206 345/440 |
| 2013/0339088 A1 | 12/2013 | Olsen et al. |
| 2013/0339089 A1* | 12/2013 | Olsen ............ G06Q 30/0202 705/7.31 |
| 2014/0114709 A1 | 4/2014 | Olsen et al. |
| 2014/0114818 A1 | 4/2014 | Olsen et al. |
| 2014/0114819 A1 | 4/2014 | Olsen et al. |
| 2014/0122176 A1 | 5/2014 | Olsen et al. |
| 2014/0122240 A1 | 5/2014 | Olsen et al. |
| 2014/0156343 A1 | 6/2014 | Olsen et al. |
| 2014/0195924 A1* | 7/2014 | Curtis ............ G06T 11/206 715/747 |
| 2014/0278779 A1* | 9/2014 | Maga ............ G06Q 10/06375 705/7.31 |
| 2015/0227518 A1* | 8/2015 | Kallan ............ G06F 16/2358 707/725 |
| 2016/0019661 A1* | 1/2016 | Bouganim ............ G06Q 50/01 705/319 |
| 2016/0253688 A1* | 9/2016 | Nielsen ............ G06F 16/337 705/7.31 |
| 2016/0284012 A1* | 9/2016 | Hom ............ G06Q 30/06 |
| 2017/0124739 A1* | 5/2017 | Perez ............ G06F 3/0488 |
| 2017/0154291 A1* | 6/2017 | Dau ............ G06Q 10/06393 |
| 2018/0350015 A1* | 12/2018 | Gordon ............ G06Q 50/20 |

FOREIGN PATENT DOCUMENTS

| | | |
|---|---|---|
| JP | H10105619 A | 4/1998 |
| JP | 2004-86269 A | 3/2004 |
| JP | 2004-519758 A | 7/2004 |
| JP | 2005-071191 A | 3/2005 |
| JP | 2006-526852 A | 11/2006 |
| JP | 2007-026147 A | 2/2007 |
| JP | 2007-531939 A | 11/2007 |
| JP | 2008-537266 A | 9/2008 |
| WO | WO-01/90998 A2 | 11/2001 |
| WO | WO-2004/109451 A2 | 12/2004 |

OTHER PUBLICATIONS

ServiceSource Launches Servicesource Customer Success App on the Salesforce1 Platform News Bites—Computing & Information [Melbourne] Oct. 9, 2014. (Year: 2014).*

ServiceSource Launches Servicesource Customer Success App on the Salesforce1 Platform Business Wire [New York] Oct. 8, 2014. (Year: 2014).*

ServiceSource Launches eCommerce Cloud Application. ServiceSource. Mar. 18, 2011. [online]. Retrieved on May 18, 2014. Retrieved from the internet <http://files.shareholdercom/downloads/ABEA-5LUUYL/3185849553x0x469467/674f7951-83ba-4692-97bd-3efbc99b32b4/SREV_News_2011_5_17_General_Releases.pdf>.

(56) References Cited

OTHER PUBLICATIONS

Aldana, Walter Alberto. Data mining industry: emerging trends and new opportunities. Diss. Massachusetts Institute of Technology, Dept. of Electrical Engineering and Computer Science, 2000. 182 pages.

Brockmann, Carsten, and Norbert Gronau. "Business models of ERP system providers." AMCIS 2009 Proceedings (2009): 582. (12 pages).

Gurau, Cahn, and Ashok Ranchhod. "Measuring customer satisfaction: a platform for calculating, predicting and increasing customer profitability." Journal of Targeting, Measurement and Analysis for Marketing 10.3 (2002): 203-219.

Jones, Z., et al. "Design of a pulse oximeter for price sensitive emerging markets." 2010 Annual International Conference of the IEEE Engineering in Medicine and Biology. IEEE, 2010. pp. 185-188.

Liberatore, Matthew J., and Wenhong Luo. "The Analytics Movement: Implications for Operations Research." Interfaces 40.4 (2010): 313-324.

Power, Daniel J., and Ramesh Sharda. "Model-driven decision support systems: Concepts and research directions." Decision Support Systems 43.3 (2007): 1044-1061.

Tounsi, Mohamed Hyes. Application and Survey of Business Intelligence (BI) Tools within the Context of Military Decision Making. Diss. Monterey, California. Naval Postgraduate School, 2012. 104 pages.

Zorrilla, Marta, and Diego Garcia-Saiz. "A service oriented architecture to provide data mining services for non-expert data miners." Decision Support Systems 55.1 (2013): 399-411.

U.S. Appl. No. 13/841,681, filed Mar. 15, 2013, US 2014-0114709.
U.S. Appl. No. 13/842,035, filed Mar. 15, 2013, US 2014-0114818.
U.S. Appl. No. 13/842,398, filed Mar. 15, 2013, US 2014-0114819.
U.S. Appl. No. 13/844,002, filed Mar. 15, 2013, US 2014-0122240.
U.S. Appl. No. 13/844,306, filed Mar. 15, 2013, US 2014-0122176.
U.S. Appl. No. 13/895,276, filed May 15, 2013, US 2014-0156343.
U.S. Appl. No. 13/895,294, filed May 15, 2013, US 2013-0339088.
U.S. Appl. No. 13/895,302, filed May 15, 2013, US 2013-0339089.
PCT/US2014/066230, Nov. 18, 2013, WO 2015/074079.

\* cited by examiner

DISMISS TASK

Task Name        Contact Customer

Play             Onboarding

Playbook         Onboarding

Task State       Please Select

Risk Reason      [ 10/10/2014 ]

Completed On     ☐

Create Follow Up Task

Comments

DISMISS    CANCEL

| SF Name | Field | Display Name | SF Data Type | Active |
|---|---|---|---|---|
| AnalyticsEngine__Demand__c | Account.AnalyticsEngine__Demand__c | Demand | DOUBLE | ☐ |
| AnalyticsEngine__Active_Devices__c | Account.AnalyticsEngine__Active_Devices__c | Active Devices (%) | DOUBLE | ☐ |
| AnalyticsEngine__Current_Demand__c | Account.AnalyticsEngine__Current_Demand__c | Current Demand | DOUBLE | ☐ |
| AnalyticsEngine__NumUpSells__c | Account.AnalyticsEngine__NumUpSells__c | NumUpSells | DOUBLE | ☐ |
| AnalyticsEngine__NumCrossSells__c | Account.AnalyticsEngine__NumCrossSells__c | NumCrossSells | DOUBLE | ☐ |
| AnalyticsEngine__NumRetentionRisks__c | Account.AnalyticsEngine__NumRetentionRisks__c | NumRetentionRisks | DOUBLE | ☐ |
| NumberofLocations__c | Account.NumberofLocations__c | Number of Locations | DOUBLE | ✓ |
| AccountNumber | Account.AccountNumber | Updated Name | STRING | ✓ |
| AnnualRevenue | Account.AnnualRevenue | Annual Revenue | CURRENCY | ✓ |
| Type | Account.Type | Account Type | PICKLIST | ✓ |
| SLAExpirationDate__c | Account.SLAExpirationDate__c | SLA Expiration Date | DATE | ✓ |
| NumberOfEmployees | Account.NumberOfEmployees | Employees | INTEGER | ✓ |
| UpsellOpportunity__c | Account.UpsellOpportunity__c | Upsell Opportunity | PICKLIST | ✓ |
| LastActivityDate | Account.LastActivityDate | Last Activity | DATE | ✓ |
| Birthdate | Contact.Birthdate | Birthdate | DATE | ✓ |
| CSR_Health_Status__c | Account.CSR_Health_Status__c | Health Status | PICKLIST | ✓ |
| AnalyticsEngine__ARR__c | Account.AnalyticsEngine__ARR__c | ARR | CURRENCY | ✓ |
| AnalyticsEngine__MRR__c | Account.AnalyticsEngine__MRR__c | MRR | CURRENCY | ✓ |
| AnalyticsEngine__Current_Demand_Change__c | Account.AnalyticsEngine__Current_Demand_Change__c | Current Demand Change | DOUBLE | ✓ |
| AnalyticsEngine__HistoricalCLV__c | Account.AnalyticsEngine__HistoricalCLV__c | Historical CLV | CURRENCY | ✓ |
| AnalyticsEngine__PredictedCLV__c | Account.AnalyticsEngine__PredictedCLV__c | Predicted CLV | CURRENCY | ✓ |
| AnalyticsEngine__Assigned_Usernames__c | Account.AnalyticsEngine__Assigned_Usernames__c | Assigned Usernames | DOUBLE | ✓ |
| AnalyticsEngine__Active_Usernames__c | Account.AnalyticsEngine__Active_Usernames__c | Active Usernames (%) | DOUBLE | ✓ |

USER INTERFACE AND UNDERLYING DATA ANALYTICS FOR CUSTOMER SUCCESS MANAGEMENT

CROSS-REFERENCE TO RELATED APPLICATION

The current application claims priority under 35 U.S.C. § 119(e) to U.S. Provisional Application No. 62/063,349 filed Oct. 13, 2014, the disclosure of which is incorporated herein by reference.

TECHNICAL FIELD

The current disclosure relates to user interfaces and approaches for creating and presenting results of data analytics in support of customer success management activities.

BACKGROUND

Customer success management (CSM) is a growing field characterized by efforts to predict customer behavior and ideally influence it in a manner that increases the likelihood for additional future sales. A key tenet of many CSM approaches is that it is generally easier to keep an existing customer happy (or ideally sell additional goods or services to an existing customer) than it is to create a new customer. For example, customers who do not use a purchased product or service (or, alternatively, who use only a small subset of features of a product or service) are unlikely to renew (customer retention), and customers who make heavy use of a product may be good targets for up-selling and/or cross-selling or additional or higher value products or services.

Customer success management of recurring revenue streams (e.g. contracts and the like for recurring revenue assets) can present a number of challenges that differ in substantial and important ways from the typical focus of the sales staff of a commercial entity. As used herein, a recurring revenue asset can generally refer to one or more of maintenance and/or support agreements for software or hardware, service covered products, service contracts, subscription agreements, warranties, renewables, or the like.

SUMMARY

The subject matter described herein includes a number of features that can be included in any feasible combination as part of a customer service management approach for recurring revenue assets. Consistent with some aspects of the current subject matter, a CSM application or other CSM software tool (or set of tools) can include features relating to customer lifecycles, product usage, and/or customer success, each of which can be monitored based on various analytical measures, metrics, indicators, etc. provided by one or more analytical engines.

In one aspect, a computer-implemented method includes accessing, from one or more data sources, usage data quantifying underlying usage of products and/or services provided by a vendor organization to one or more customers. One or more representatives at the vendor have responsibility for accounts associated with the one or more customers. The method further includes mapping the usage data to an indicator comprising one or more account health metrics representative of account health of the accounts. The one or more account health metrics relate to a probability of the one or more customers renewing service or maintenance contracts associated with the products and/or services. A value judgment for the indicator is determined, and the determining includes comparing a current status of the one or more account health metrics to at least one value judgment criteria assigned to the indicator by an administrator at the vendor. The method further includes providing a graphical user interface to a computing system for display on a display device. The graphical user interface includes a visual depiction of the value judgment showing a status of the indicator.

In optional variations, one or more of the following features can be included in this aspect in any feasible combination. The usage data can include at least one of data relating to customer experience with the product, and recurring revenue management data. The visual depiction can further include a numerical value of the indicator. The numerical value can be directly provided by an analytics engine based on customer service management data from a customer service management database and/or calculated based on one or more values provided by the analytics engine. The method can further include receiving configuration inputs from the administrator. These configuration inputs can cause configuration of an account plan management screen displayed in the graphical user interface. The account plan management screen can include the visual depiction. The one or more account health metrics can be based on historical use data from other customers and can be selected based on other customers having one or more characteristics similar to the one or more customers. The visual depiction can include an account health chart providing a snapshot view of the status of the one or more account health metrics. The visual depiction can include an action section that includes icons relating to key information associated with the accounts. The visual depiction can further include a health indicator chart that includes drill down functionality such that selection of the drill down functionality results in display within the graphical user interface of a listing of the accounts indicating which of the accounts fall within each of a plurality of groupings. The plurality of groupings can include a healthy group of the accounts and a plurality of groups of unhealthy accounts. The plurality of groups of accounts can include a low adoption group and a pending churn group. The graphical user interface can further include an account timeline, which can include timeline elements associated with significant events associated with at least one of the accounts. The account timeline can include a visual display of phases of an account lifecycle.

In an interrelated aspect, a computer-implemented method includes assigning a plurality of tasks to a user of a customer success management application. A success plan defined by a success plan definition includes a plurality of plays, which each comprise a task of the plurality of tasks. The success plan definition is associated with at least one phase of a lifecycle of an account associated with a purchase by a customer of at least one recurring revenue product from a vendor. The method further includes monitoring whether the user chooses to complete or dismiss a task of the plurality of tasks and analyzing, using an analytical engine receiving data from one or more sources, an efficacy of a play that includes the task. The analyzing is based on the data as well as information about the completion or dismissing of the task. The analyzing includes evaluating and providing one or more metrics quantifying correlations between completed and/or declined tasks and one or more indicators of success of the at least one phase. The success plan definition is modified based on the analyzed efficacy of the play, and the success plan is later assigned to a user or another user based on the success plan as modified.

In optional variations, one or more of the following features can be included in this aspect in any feasible combination. The method can further include providing a graphical user interface to a computing system for display on a display device. The graphical user interface can include a visual representation of the assigned plurality of tasks. The visual representation of the assigned plurality of tasks can include one or more, or all of, a vendor-user category to which the plurality of tasks are assigned, a status of the plurality of tasks, and a timeline representing the at least one phase. The at least one phase can include one or more of customer onboarding, customer adoption, customer retention, customer renewal, a time period, and a company initiative.

In another interrelated aspect, a computer-implemented method includes providing a graphical representation of a lifecycle for a customer account for display on a computing system to a user of a customer success management application. The representation of the customer account lifecycle includes a plurality of phases of a lifecycle of a relationship between a recurring revenue asset vendor organization and a customer. The method further includes determining a value of at least one indicator of account health for the relationship, where the determining includes use of analytical results based on output of an analytical engine that receives and processes data from at least one data source. The method also includes dynamically updating the graphical representation of the customer account lifecycle based on the at least one indicator and a definition of at least one play in a success plan for the customer account. The success plan is defined by a success plan definition that includes a plurality of plays, which each comprise a task. The success plan definition is associated with at least one phase of the plurality of phases of the lifecycle.

In optional variations, one or more of the following features can be included in this aspect in any feasible combination. The graphical representation can include a timeline that visually depicts the plurality of phases. The timeline can include a plurality of icons displayed with spacing along the timeline representative of either or both of when the tasks of the success plan were completed and when the tasks should be completed. The success plan definition can include a configurable trigger and/or a threshold relating to one or more predefined criteria, such that when the trigger and/or a threshold is met for the at least one indicator, a play of the success plan is triggered.

Among other possible implementations, computer-implemented methods can include one or more of the functions, processes, operations, or the like performed by computing hardware, which can include computer circuitry, a programmable processor (also referred to as a general purpose processor) executing machine-readable instructions that cause it to perform operations, etc. Distributed computing frameworks, in which multiple programmable processors within a single computing system or in multiple linked computing systems are also consistent with the approaches described herein. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Also consistent with the descriptions provided herein, an article can include a tangibly embodied machine-readable medium operable to cause one or more machines (e.g., computers, etc.) to result in operations implementing one or more of the described features. For example, a non-transitory, machine-readable medium can include, encode, store, or the like instructions (e.g. one or more computer programs) that cause one or more programmable processors to perform one or more of the operations described herein when executed. Similarly, computing systems are also described that may include one or more processors and one or more memories coupled to the one or more processors and storing such instructions for execution by the one or more processors.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to recurring revenue asset management, customer success management, and/or other business software solutions or architectures, it should be readily understood that such features are not necessarily intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 12 shows a screenshot view of task dismissal window illustrating features consistent with implementations of the current subject matter;

FIG. 15 shows a screenshot view illustrating features of a CSM administrator screen for use in defining how and whether various indicators are displayed via a CSM user interface consistent with implementations of the current subject matter;

When practical, similar reference numbers denote similar structures, features, or elements.

DETAILED DESCRIPTION

In general, the period after a customer has made a purchase from a vendor organization can be an important period for monitoring customer success and improving the chances of a subsequent renewal of any recurring revenue assets associated with the purchase. In this context, a purchase can refer to purchase activities such as signing of a renewal contact (e.g. renewing an existing service contract or software license, etc.); an initial purchase of a service contract or software license, etc.; or other initiation or renewal of a recurring revenue asset. A purchase can also optionally include a purchase by a customer of a physical or service asset with which a future recurring revenue asset may be associated. For example, a purchase of new computer hardware may include a period of included (e.g. "prepaid" or "free") service or maintenance that, once expired, because an opportunity for the vendor organization to sell a recurring revenue asset (e.g. an extended service contract, additional licenses, etc.) to the customer. A renewal of a recurring revenue asset does not happen in a vacuum and that activities of both users at the customer and sales and support staff at the vendor organization during a current recurring revenue relationship can have a significant impact on the likelihood that the customer will renew recurring contract and/or (ideally) extend or increase the value of goods or services contracted for under a future contract.

Figure 1:
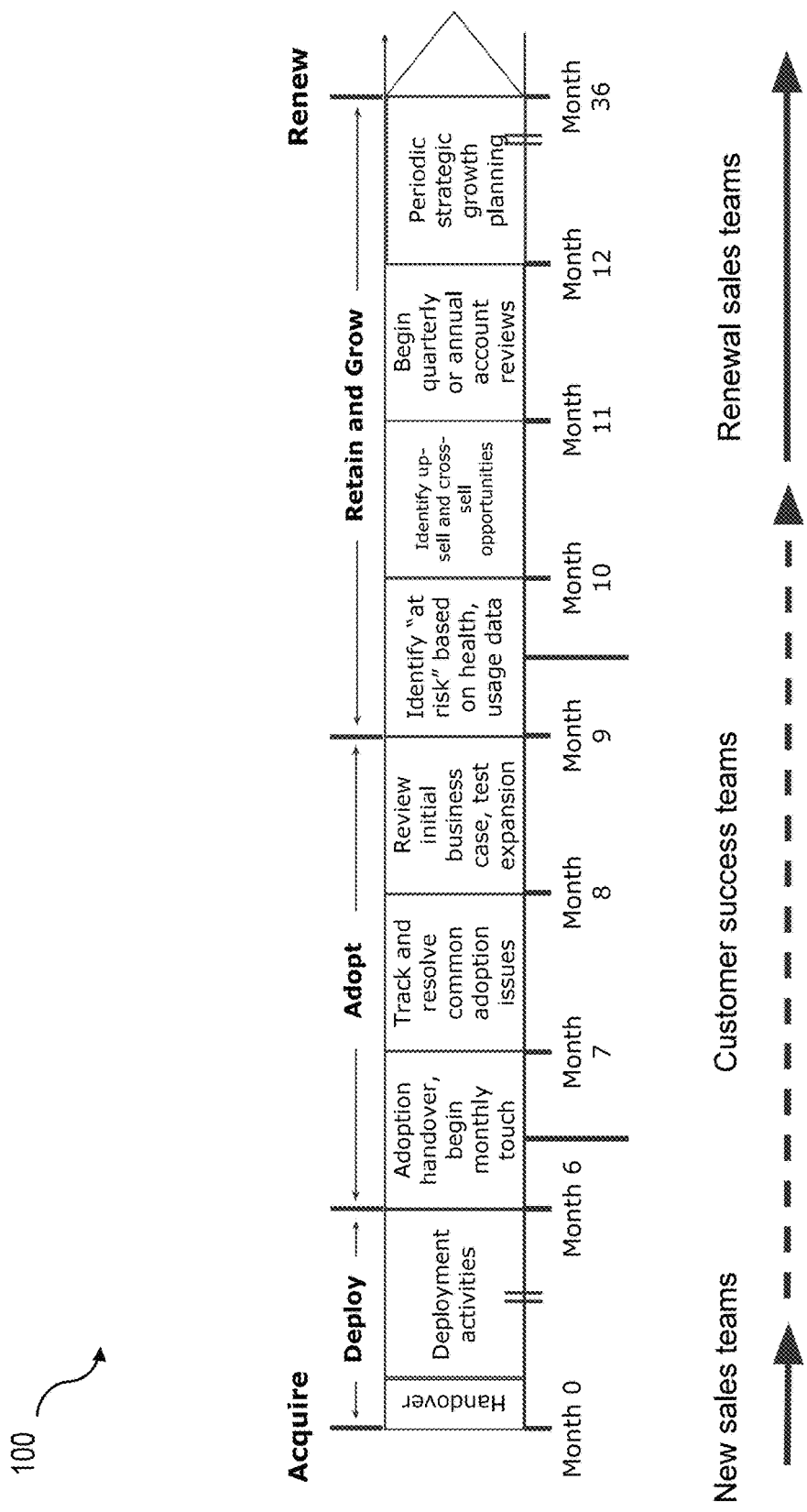
FIG. 1 shows a timeline diagram.

Implementations of the current subject matter can provide methods, systems, articles of manufacture, and the like relating to use of a centralized customer intelligence data hub (referred to herein as an analytics engine) for providing predictive analytics that can deliver actionable insight into customer behavior, evaluate health and retention risks for customer accounts, and recommend the right set of interactions for each customer. In this manner, a vendor organization (e.g. a sales organization that provides goods and/or services) has access to tools for profiling a successful customer lifecycle, and monitoring relating to customer success to facilitate identifying of those customers who are not traversing a target lifecycle pattern as optimally as possible. CSM users at the vendor organization can be presented with prescriptive sets of "plays," which can be organized into success plans to ensure best practices are applied for processes targeted to customer lifecycle phases including on-boarding, customer adoption, customer retention processes, a time period (e.g. Q1, Q2, etc.), a company initiative, or the like. These approaches can maximize the probability of customer success and thereby increase the chance for maintaining or even expanding revenue streams the vendor organization can realize from its relationship with the customer FIG. 1 shows a timeline diagram 100 illustrating an example of a customer lifecycle and how a vendor organization might interact with a customer. During an on-boarding phase (e.g. a deployment or new installation phase), new sales team members at the vendor typically interact with decision makers at the customer in the course of making an initial sale. Then, during an adoption phase, users at the customer can begin to adopt usage patterns around the purchased asset. For example, if the purchased asset is a new software package, end users at the customer can begin by undergoing training on new features and optionally porting or transferring of existing data, documents, etc. for use with the new software package. Customer success teams at the vendor organization can be tasked with tracking how users at the customer are making use of the new software package in a variety of ways. Some approaches to CSM can involve phone calls, site visits, etc. to attempt to collect feedback from users, their supervisors, decision makers, etc. at the customer in order to gauge satisfaction; success in adoption and usage; potential receptiveness of the customer to additional sales opportunities, likelihood of the customer renewing, etc. While such approaches can collect valuable insights, they are generally not analytically based and therefore are difficult to optimize or standardize across a large sales organization. Additionally, in many vendor organizations, CSM representatives may not be the same people who eventually interact with the customer as part of renewal sales efforts, which can generally increase in urgency as the term of an existing recurring revenue contract approaches its end, in what is termed the retention phase (e.g. a phase when the vendor organization hopefully renews the contract with the customer and ideally does so with a greater contract value, for example by selling higher value versions of the original goods or services and/or selling additional goods or services to the customer).

Implementations of the current subject matter provide a variety of tools that assist various members of a vendor organization in optimizing interactions with customers in a way that promotes customer success and also positions the vendor organization as favorably as possible for successful renewal sales and ideally, increased additional sales (e.g. cross-selling, up-selling, etc.) to the customer. Data analytics are of growing importance in many fields, including CSM.

However, in many cases, presentation of underlying analytical results in a manner that allows human users (who are generally not statisticians, programmers, or expert mathematicians) to quickly and efficiently take in key information and identify the tasks that are most likely to result in increased revenue is at least as important if not more so than the generation of these analytical results. A typical user can readily be overwhelmed by the sheer amount of data that can be generated around any kind of sales or CSM activity in this era of large data sets and powerful analytical tools.

In general, a CSM tool desirably has one or more features, which can include, but are not limited to, simplicity and intuitiveness of use, integration into other sales support software platforms (e.g. SalesForce, available from Salesforce.com, Inc. of San Francisco, Calif.), readily understandable displays of overall portfolio and customer relationship health assessment, intuitive planning of activities (e.g. for a portfolio, for a time period, for one or more specific accounts, etc.), streamlining of activities and user actions, driving relevant customer engagement activities to be performed by users, success metrics and indicators, support of additional sales (e.g. on-boarding, utilization, up-selling, cross-selling, renewals, promotions, issues resolution, etc.), and the like.

In at least some implementations of the current subject matter, a user interface for users at a vendor organization can include one or more of the above-noted features while serving as a readily digestible front-end interface for data analytics that can vary from relatively straightforward statistical analysis to highly complicated predictive analytics based on large data sets (e.g. "big data"), which can be representative of single customers, or optionally, based on aggregate data from multiple customers and/or vendor organizations.

Figure 2:
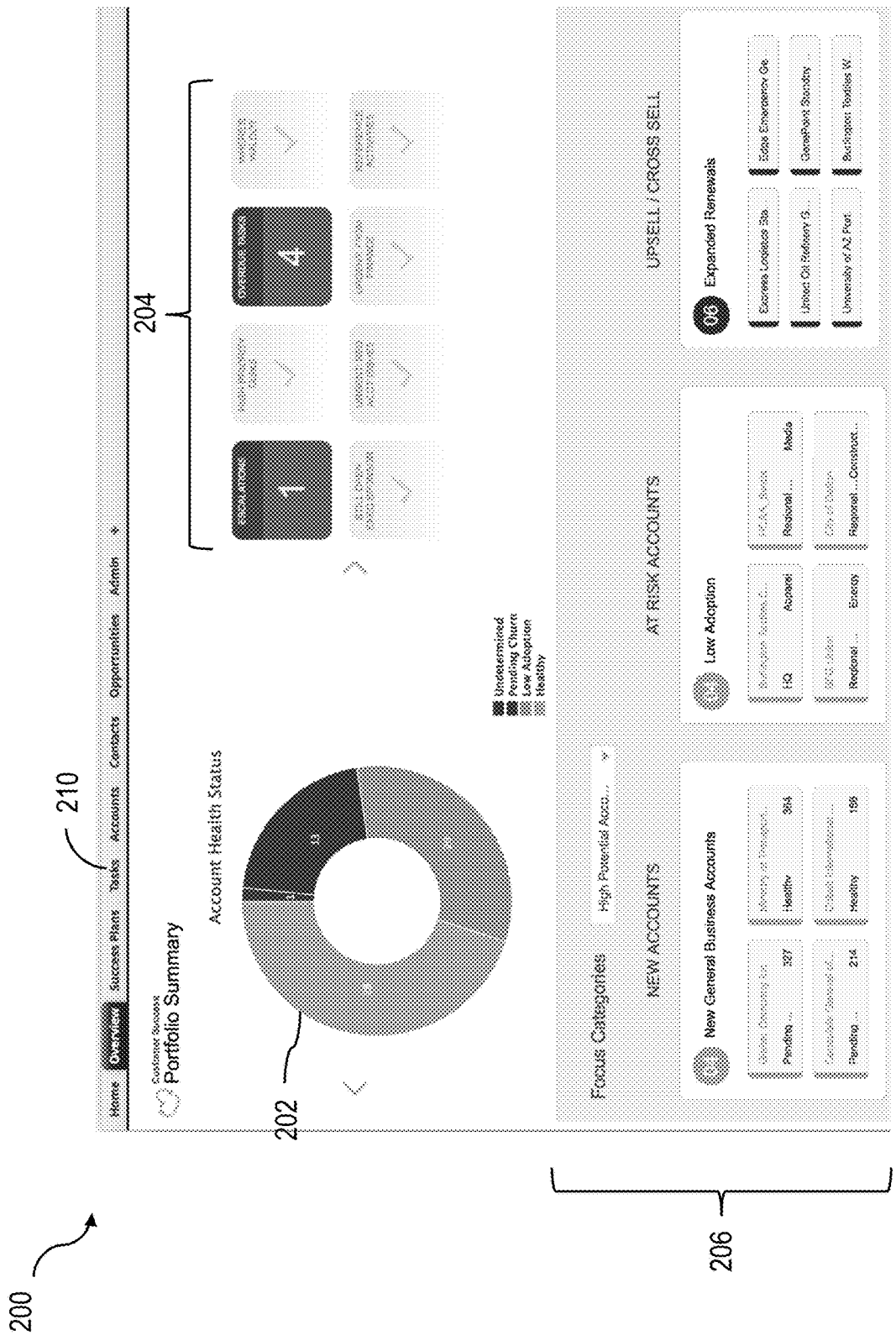
FIG. 2 shows a screenshot view of an account overview screen illustrating features consistent with implementations of the current subject matter.
Figure 3:
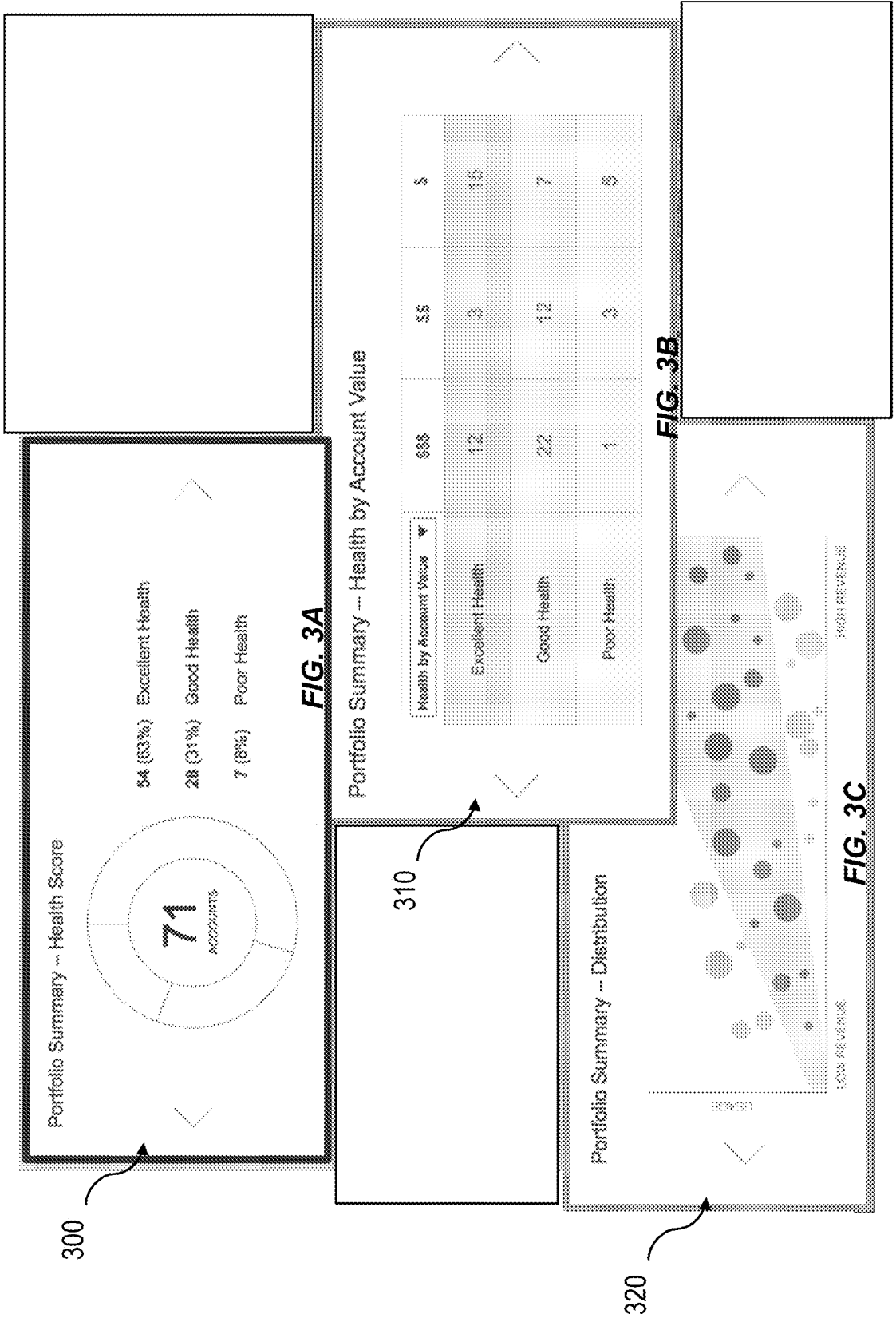
FIG. 3A, FIG. 3B, and FIG. 3C show screenshot views of examples of account or portfolio health charts consistent with implementations of the current subject matter

FIG. 2 shows an example screenshot 200 illustrating some features that can be included in a user interface consistent with the descriptions provided herein. In this view, an account health" or "portfolio health" chart 202 can be displayed to provide a snapshot view of the status of accounts under the responsibility of the user. As shown in FIG. 2, this indicator can present a visual depiction of the status of customer accounts being managed by a user or group of users. Various metrics that are representative of a "health" of one or more accounts can be included. In FIG. 2, accounts are grouped by "healthy," "low adoption," "pending churn," and "undetermined." Accounts identified as pending churn can be those for which one or analytical measures indicate a relatively low probability of the customer renewing a service or maintenance contract. Low adoption accounts can be accounts for which users at the customer have been determined to (e.g. via one or more analytical measures) to have insufficient frequency, depth, etc. of usage of a product (e.g. hardware, software, etc. covered by a recurring revenue agreement). Low adoption rates can be an early indicator that a customer might choose not to renew the contract upon expiration or, alternatively, that opportunities for cross selling or up-selling additional services, goods, etc. to the customer are unlikely. Accounts identified as undetermined can be those for which insufficient data is available to calculate analytical measures. FIG. 3A, FIG. 3B, and FIG. 3C show screenshots 300, 310, 320 illustrating some potential variations of displays that can be used for the portfolio or account health chart. These charts can include a health score chart 300, a table 310, or a distribution chart 320.

Figure 4:
FIG. 4 shows a screenshot view of a drill down screen illustrating features consistent with implementations of the current subject matter.

Selection by a user of a part of the health indicator chart 202 in FIG. 2 can result in display of a drill-down display listing those accounts that fall within each presented group of accounts. As an example, FIG. 4 shows a screenshot 400 of a user interface view resulting from selection of the "low adoption" section of the health indicator chart 202 in FIG. 2. The resulting display includes a listing 402 of all accounts summarized in this section of the health indicator chart 202. Also included in this listing are designations of success plan names 404 for several of the listed accounts and indications 406 of whether or not the designated success plan is active. Success plans are discussed in greater detail below.

Also included in the screenshot 200 of FIG. 2 is an action tile section 204, which can include icons relating to key information to which the user's attention is desirably drawn. For example, action tiles can include escalations (e.g. tasks that require additional attention due to some underlying trigger event or metric), as well as "urgent red account issues," which can optionally correspond to those accounts that are reflected in the "pending churn" section of the indicator chart 202. For example, such accounts may be those for which one or more analytically derived metrics indicate that an account is unlikely to be renewed at the end of its current contract term. Other possible action tiles can include, but are not limited to, overdue tasks, high priority tasks, tasks with target completion dates within some time frame (e.g. today, today or tomorrow, this week, etc.), upcoming events, new "plays" (discussed in more detail below), urgent messages from other departments (e.g. finance, or the like), etc. Action tiles can assist in guiding CSM users to immediate actions, for example tasks, items, issues, or the like that need to be addressed immediately. The content displayed in the action tile section 204 can be configurable, either at the user level or by a user with administrative access, to suit specific business processes of the vendor organization.

Figure 5:
FIG. 5 shows a screenshot view of another drill down screen illustrating features consistent with implementations of the current subject matter.

Clicking through (e.g. selecting one of the action tile icons in the screenshot 200, such as by clicking, tapping, etc. or using a keyboard shortcut) can cause display of a drill down screen, such as for example those shown in the screenshots 500 of FIG. 5, respectively. The screenshot 500 of FIG. 5 shows a screen that can result from selection of the escalations action tile in the screenshot 200. A listing 502 of tasks can be shown, and this list can include relevant information about these tasks. Also included in the screenshot 500 is additional information about the account 504 to which a selected task is related, one or more contacts relevant to the account 506, and details of a currently suggested "play" 510 that can be used as guidance for the user in completing some or all of the task.

In addition to the action tile section 204, the screenshot 200 of FIG. 2 also includes a focus category detail section 206, which can include an arrangement of user interface elements capable of displaying additional information (optionally including information available via drill down actions) about specific accounts, tasks, etc. that underlie the action tile summary information and/or other information that is useful to a CSM user. Focus categories can provide a CSM user with a snapshot of "what's next," for example by assisting in planning and prioritizing daily, weekly, etc. activities. Focus categories can include immediate and/or pressing tasks, issues, action items, etc.; information about account and/or portfolio risk identification, status of "plays" (discussed in more detail below) for various accounts, etc. Focus categories can be configured to group tasks or accounts, and can be set by a manager, an end user, a user with administrator access, etc. Tasks can be completed or declined directly from the focus categories section of the user interface (e.g. from within the screen shown in the screenshot 200).

Selection of one of the items in this section also results in display of a drill down screen giving further detail about tasks, accounts, etc. that are related to or otherwise associated with the focus categories. As used herein, a focus category is a grouping of information that can assist in focusing user activity related to opportunities, tasks, and other workflow items, thereby conveying information regarding progress on those activities, and directing navigation to complete the activities.

As noted above, implementations of the current subject matter relate to use of a presentation of the results of underlying data analytics in a manner that is readily digestible and actionable by an end-user of a customer success management application. One aspect of this approach includes the use of success plans, which generally include one or more plays. The term "plays" as used herein refers generally to sets of one or more tasks or actions, such as for example a sequence of tasks or actions, that are grouped. Execution of a play involves completion of the grouped tasks or actions within a time period. Plays can be treated as suggestions rather than rigid rules. In other words, a user can choose to complete, decline to use, or defer completion of all or part of a play.

User interface features consistent with implementations of the current subject matter can allow a user to readily elect to complete/decline/defer tasks, actions, either piecewise within a play or as an entire atomic unit.

Additionally, data analytics can be included to evaluate and modify the use of plays in manner that improves user performance and/or better conforms to real-world usage of the plays. For example, an analytics engine can evaluate and provide metrics quantifying correlations between completed and/or declined plays, tasks, etc. and one or more indicators or metrics. The results of such analyses can be used to improve plays dynamically or to suggest alternative plays. A sequence of tasks in a play can be determined dynamically based on results provided by the analytical engine, which can optionally include customer usage data relating to goods and/or services sold to the customer by the vendor organization.

Figure 6:
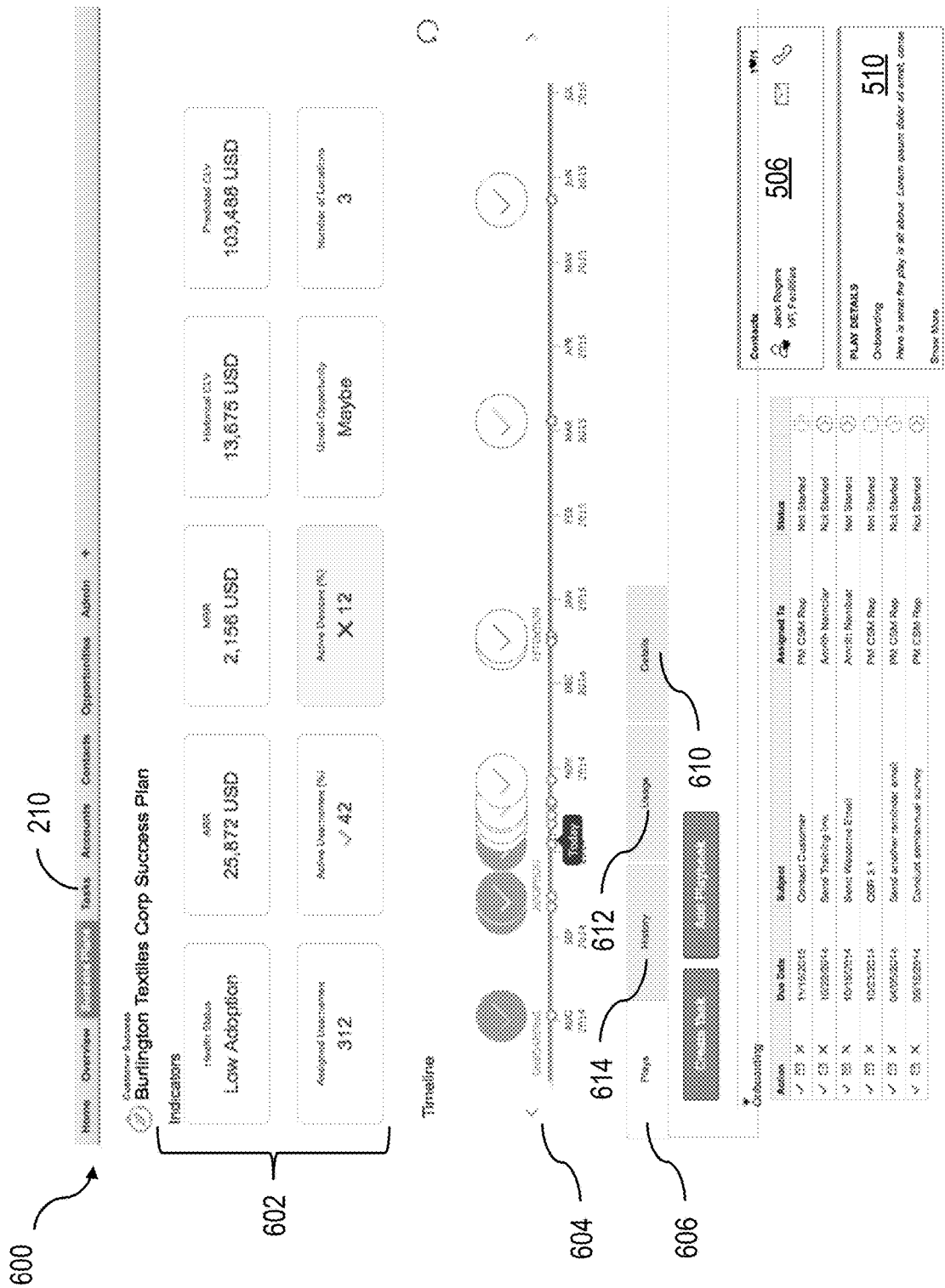
FIG. 6 shows a screenshot view of another drill down screen illustrating features consistent with implementations of the current subject matter.

FIG. 6 shows a screenshot 600 of a success plan management screen that includes several features relating to success plans consistent with implementations of the current subject matter. A success plan, as discussed above, can be targeted for an account or group of accounts. The screenshot 600 of FIG. 6 includes an indicators section 602, in which at least one, and optionally multiple, indicators are displayed. The indicators can be numerical values that are either directly provided by an underlying analytics engine based on CSM data from a CSM database or calculated based on one or more values provided by the analytics engine (e.g. as a function of one or more such values). In addition to the numerical indicator values, a visual depiction of a status of the indicator can also be displayed for one or more of the indicators. The status depicted can amount to a "value" judgment that quickly informs a user of whether the numerical value of an indicator is "good" or "bad" (or optionally or additionally one or more other status values). For example, an active user names indicator value of 42% can be accompanied by a visual depiction of a check mark or other visual depiction that the indicator value is good or at least satisfactory (e.g. above, near, or below some threshold value or within or outside of one or more defined ranges). The visual depictions can be binary or can alternatively illustrate more than two states of an associated indicator value. The indicators can provide CSM insights and summary utilization and can be derived from usage data, and analytics, etc. supported by the analytics engine. In FIG. 6, the status indicators are (optionally green) check marks and (optionally red) "X"-es. Other status indicators are also within the scope of the current subject matter.

The indicators, and the selection of indicators to be displayed on a success plan management screen, can be configurable, for example by a manager, user with administrative access, or even optionally an end user. For example, an administrator, a CSM manager, a CSM team leader, or other CSM user at the vendor organization with configuration or setup privileges can configure an account plan management screen, for example by choosing which indicators are to be displayed, an order in which the indicators are displayed, etc. Such a user can also optionally define indicators based on available analytical measures provided by an analytics engine operating on CSM data, which can be retained in a CSM database. Additionally, an authorized user can define metrics indicative of a status of the various indicators. For example, one or more ranges of values of a given indicator can be defined such that for a given value of an indicator, a visual depiction of status is displayed to an end user. When the account plan management screen is displayed, the indicators can be populated with values based on currently available data for a specific account or group of related accounts and the appropriate visual depictions of indicator status for that account or group of related accounts can be displayed in association with the indicator values.

The screenshot 600 also includes a timeline feature x, which can include visual displays of phases of a CSM lifecycle for the specific account. Phases of the lifecycle can include on-boarding, adoption, and retention. The account timeline can highlight key upcoming activities and milestones during the customer lifecycle, and can provide a "history at a glance" view for a CSM user. A mouseover (or other user interface element interaction) can provide a link to an underlying record, such as for example objects in a recurring revenue management model, which can relate to tasks, plays, opportunities, contacts, or the like. In other words, the timeline feature 604 can include additional icons or other event elements that correspond to actions, tasks, etc. that are included in plays as part of the success plan. These event elements can visually indicate whether or not the corresponding action or task has been completed (e.g. by a different visual appearance for planned or completed actions or tasks). The placement of the event elements along the timeline indicates when the corresponding action or task has been completed or should be completed. In some implementations of the current subject matter, phases can have start and end dates, which can be defined (e.g. by an authorized user) via a plan administration screen or template. In some examples, phase dates need not necessarily appear on the timeline. Rather, a length of the bar or segment representing each phase can be related to the duration defined for that phase. Activities from tasks, events, or even plays related to the plan can appear as dots or other icons displayed in a position along the timeline corresponding to relative timing of the tasks, events, plays, etc.

The icons in the timeline can be displayed in one manner (e.g. filled in, or some other visual appearance) to indicate past/completed activities and in another manner (e.g. open/not filled in, or some other visual appearance difference from that used for past/completed activities) to indicate planned or not yet completed activities. For completed activities, text can be provided near the icon (or alternatively accessible via a mouse over, right click, or other user interface interaction) to provide additional information such as a completion date, activity subject, etc. (which can be provided from one or more data objects linked to the account). For planned or other not yet completed activities, a similar approach can be used to provide due dates, activity subjects, and the like (which can be provided from a definition of the account plan. In one example, a default view can show approximately 90 days prior to a "Today" label (e.g. to indicate the current date/time) and approximately 365 days after "Today" such that 5 quarters of a year are displayed. The amount of time displayed in the timeline view can be altered via clicking, dragging, or other user-interface interaction with a portion of the timeline. For example, a click and drag operation can result in zooming in or out of the view to show finer or coarser levels of temporal detail with respectively less or more total time shown.

Also as shown in FIG. 6, a plays tab 606 is selected. In this tab, information about available and suggested plays relating to an active success plan for the selected account is displayed. As in other screens, contacts 506 relating to the account and/or to specific actions targeted by one or more displayed plays can be included. Additionally, a play detail pane 510 can include additional specifics relating to a play. Further details relating to the success plan for a selected account or group of accounts can be displayed via selection of a details tab 610 in the screenshot 600. Plays (which generically refers both to entire plays as well as to individual tasks, activities, and actions that can be included within a play) can be dynamic or preset. Dynamic plays, activities, tasks, etc. can be triggered by usage data (for example plays relating to an adoption phase of the customer lifecycle) or other analytics provided by the analytics engine. Preset plays, activities, tasks, etc. can be based on best practices (e.g. scheduling of periodic business reviews, etc.). Both dynamic and preset plays can be used to drive actions to be completed by CSM users. In some implementations of the current subject matter, CSM users (e.g. one or more of end users, managers, administrators, etc.) can be able to add playbooks (e.g. sets of one or more plays) and tasks manually into the success plan for a given account.

Figure 7:
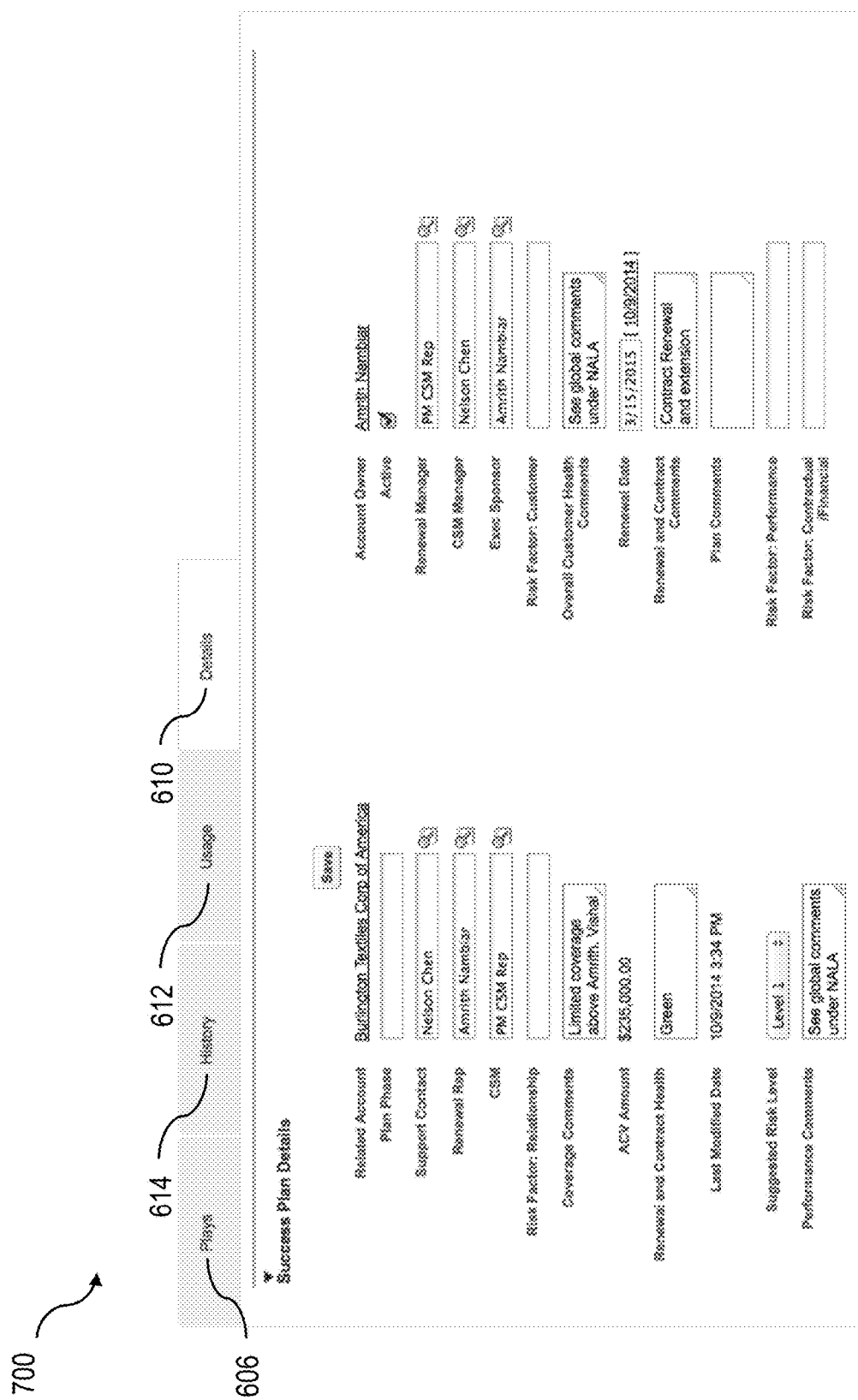
FIG. 7 shows a screenshot view of a success plan details screen illustrating features consistent with implementations of the current subject matter.

FIG. 7 shows a screenshot 700 illustrating an example of information that can be displayed in the success plan details tab 610, which can include some of all of information about an account owner, a support contact, a manager and/or one or more representatives at the vendor organization responsible for renewals for the account, CSM managers and/or representatives, information about relationship risk factors, details about a current recurring revenue relationship with the customer for the account (e.g. length of current contract, length of the relationship, a current contract expiration date, health of the account as determined based on data analytics, comments, etc.). This contact and play information can be provided in context to enable fast completion of straightforward tasks. Contacts can optionally be "favorites," which can be flagged by the CSM user as relevant to customer success processes for a given account, and need not include all possible contacts related to the account. This contextual information can be provided as a refresher to assist a CSM user if a given process is complicated or new. Links can also be embedded to direct users to one or more items retained in a central content repository that may be useful in completing all or part of a play.

Figure 8:
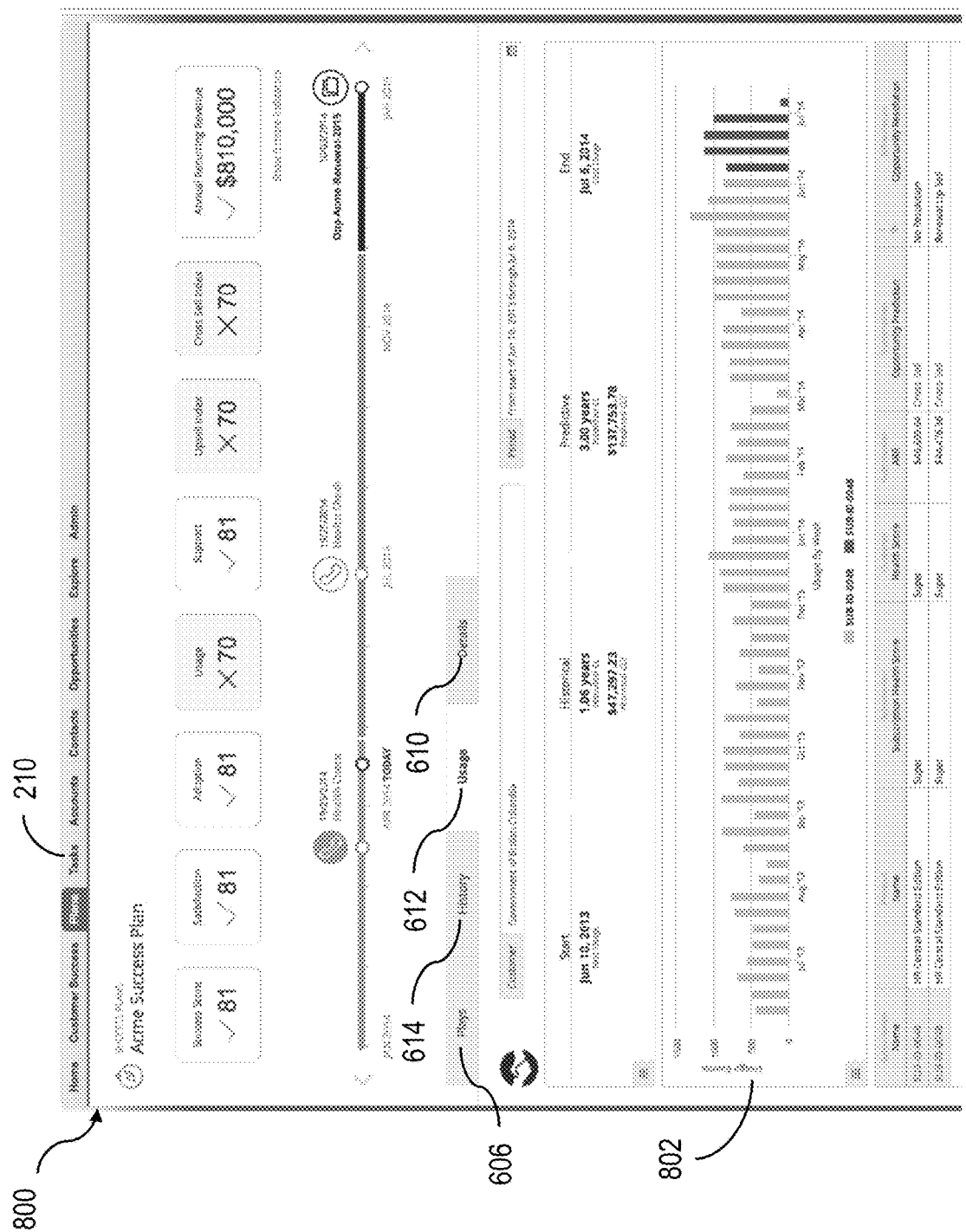
FIG. 8 shows a screenshot view of a usage or subscription screen illustrating features consistent with implementations of the current subject matter.

FIG. 8 shows a screenshot 800 illustrating an example of information that can be displayed upon selection of a usage or subscriptions tab 612. This screen can include one or more charts 802 that include a visual display of data derived from either for both of a recurring revenue database and an analytics engine. This information can be displayed within the context of the specific account to speed task completion while providing immediate access to insight for CSM users.

Figure 9:
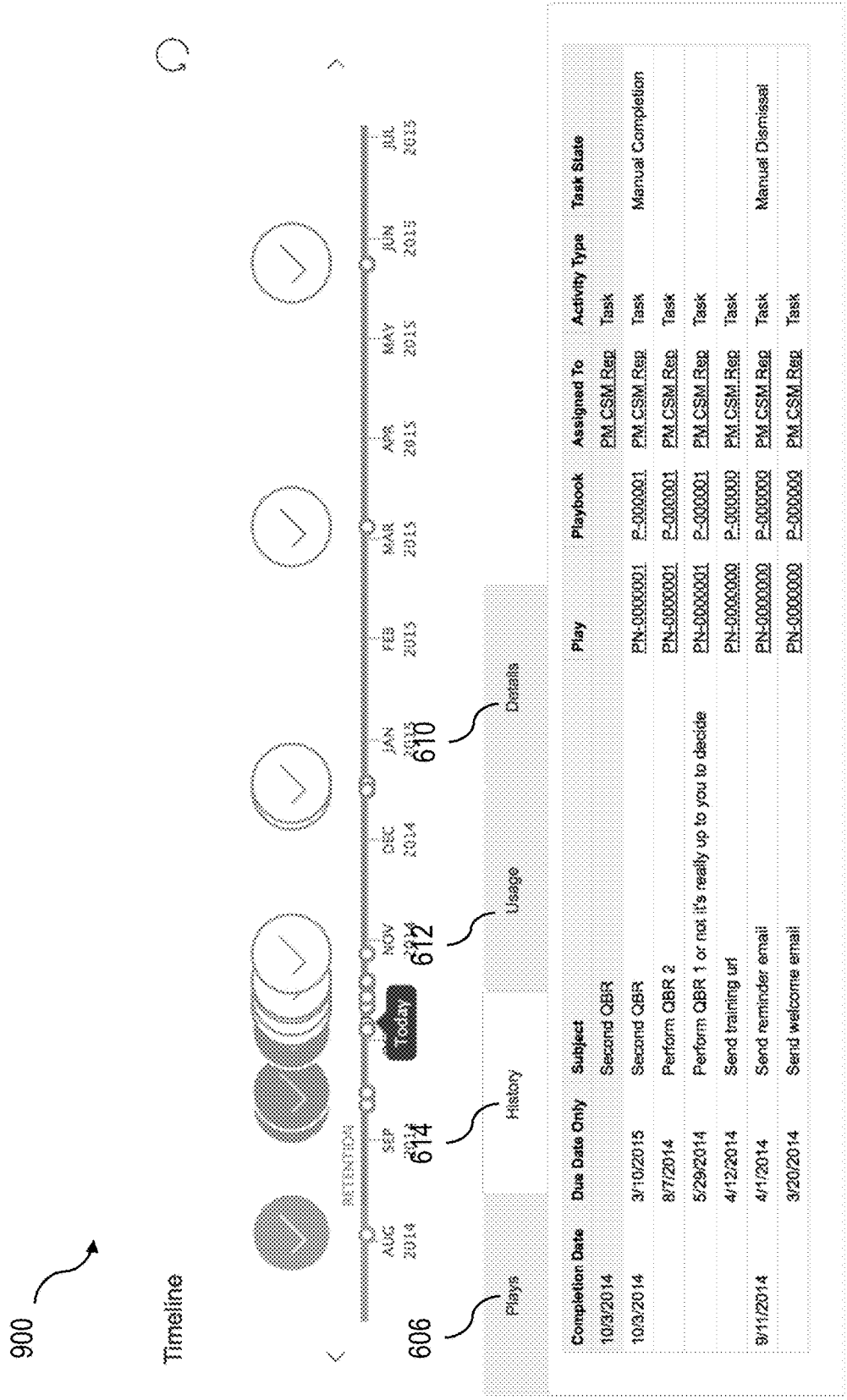
FIG. 9 shows a screenshot view of a history screen illustrating features consistent with implementations of the current subject matter.

FIG. 9 shows a screenshot 900 illustrating an example of information that can be displayed in a success plan history tab 614, which can include information about competed tasks, actions, etc. listed as parts of plays that are included in the success plan.

Figure 10:
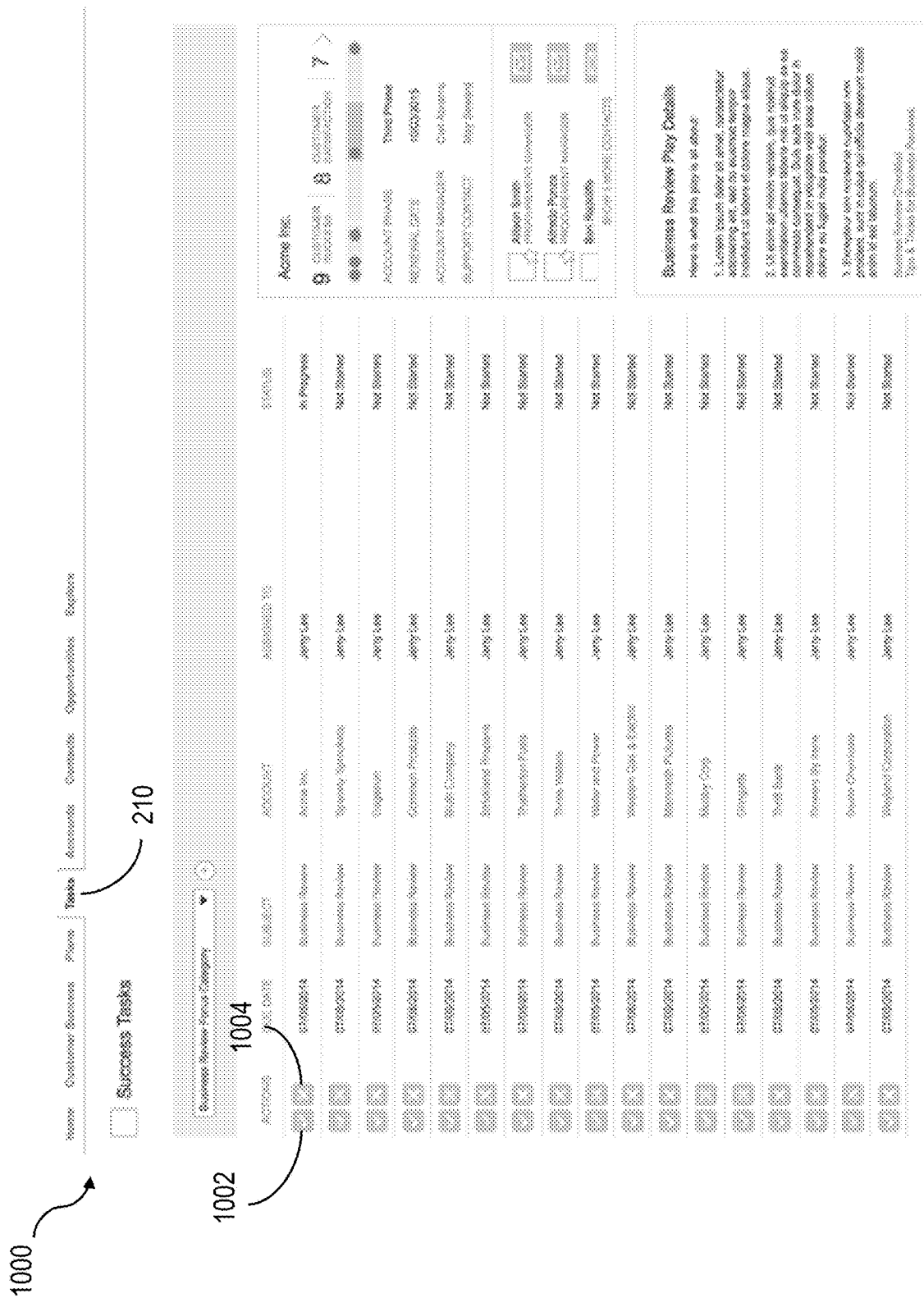
FIG. 10 shows a screenshot view of a tasks management screen illustrating features consistent with implementations of the current subject matter.

FIG. 10 shows a screenshot 1000 illustrating an example of a tasks detail screen accessible via a tasks tab 210. This screen can allow CSM users to view a variety of lists of tasks and quickly update the status of the task, thereby assisting in rapid disposition of tasks, either by noting the tasks as completed or by demising a task. A consolidated listing of tasks presented in this manner can improve efficiency in eliminating the need to navigate into each individual detail form to understand account context or what must be done. A CSM contacts widget allows CSM users to easily understand which contacts related to the account are most relevant to a task. A plan overview, a playbook, and play information can also be provided in the sidebar to give CSM users access to all the pertinent information for each task, saving time and clicks.

Figure 11:
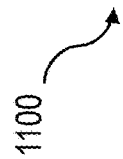
FIG. 11 shows a screenshot view of a task completion window illustrating features consistent with implementations of the current subject matter.

FIG. 11 shows a screenshot 1100 showing an example of a task completion screen, which can be accessed in a variety of ways, including but not limited to selection of a task completion user interface element (e.g. a check mark, or the like) 1002 on a task list screen such as that shown in FIG. 10. FIG. 12 shows a screenshot 1200 showing an example of a task dismissal screen, which can be accessed in a variety of ways, including but not limited to selection of a task dismissal user interface element (e.g. an X, or the like) 1004 on a task list screen such as that shown in FIG. 10. The task completion screen can include prompts for a completion date (which can be auto-filled), a risk reason assessment, creation of a follow-up task, and general comments. The task dismissal screen shown in FIG. 12 can similarly include prompts for a dismissal date (which can be auto-filled), a risk reason assessment, creation of a follow-up task, and general comments. A user can enter the risk reason assessment via a pull-down menu as shown in FIG. 11. Alternatively or in addition, other user interface elements (e.g. radio buttons, check boxes, free text entry, etc.) can be used for this feature. Consistent with some implementations of the current subject matter, risk reasons entered by a user via this feature can be tracked, for example by an analytical engine, and used in conjunction with other metrics relating to customer success to evaluate the effectiveness of plays (as well as actions, tasks, activities within plays), groups of plays, and/or success plans as a whole. In other words, task completion risk reasons are an additional part of the contextual data tracked for each instance of a play, action, task, activity, etc. such that the analytical engine can make determinations about and recommendations for improving the effectiveness of various aspects of plays, playbooks, and plans. Examples of task completion risk reasons can include, but are not limited to, product issues, support issues, sales issues, product feature weakness, etc.

A plan (also referred to as a success plan) is a series of plays, generally organized over a longer time frame (e.g. a year, a quarter, etc.) and having structured time-based phases, each of which can invoke one or more plays. Plans are generally designed to set the stage for a successful renewal (e.g. based on time, condition of account, etc.). Each phase can be associated with its own indicator(s), customer health goal(s), etc. A phase can optionally end when one or more criteria are satisfied, for example, when all tasks associated with the phase are completed, when a next phase begins, and/or when one or more other metrics reach target values, which can optimal be predefined, dynamically calculated, etc. Success plans can allow CSM representatives, managers, etc. to create a customer engagement strategy that ensures best practice engagement at every phase of the end-to-end customer lifecycle. As noted above, a timeline with associated plays can be defined for the account, along with a variety of key performance indicators. The risk reason assessment for dismissed tasks can also be tracked, for example by an analytical engine, and used in conjunction with other metrics relating to customer success to evaluate the effectiveness of plays (as well as actions, tasks, activities within plays), groups of plays, and/or success plans as a whole. In other words, task dismissal risk reasons are an additional part of the contextual data tracked for each instance of a play, action, task, activity, etc. such that the analytical engine can make determinations about and recommendations for improving the effectiveness of various aspects of plays, playbooks, and plans. Examples of task completion risk reasons can include, but are not limited to, "overtaken by events," wrong timing, wrong action, problem solved, and the like.

Consistent with implementations of the current subject matter, success plans involve a proactive approach to increasing revenues of the vendor organization, for example using analytical measures (e.g. generated from an analytical engine) that quantify underlying usage of products and/or services provided by the vendor organization to the customer. Other customer data can also be incorporated in to the analytical measures to predict those customer relationships that are less "healthy" than they might appear and then direct use of success plans for improving customer success to improve the likelihood that the customer will choose to renew chance of renewal. The current subject matter can also support similar approaches for encouraging up-selling and/or cross-selling by providing CSM and sales representatives with key information relating to whether a customer may need or want additional goods or services. Such evaluations can be made on an ongoing basis and the relevant information presented to CSM users in an actionable manner such that issues that might negatively affect retention as well as opportunities for selling additional value can be identified early in the lifecycle and due to the use of underlying data analytics from the analytics engine. In this manner, proactive strategies can be implemented and CSM user adherence to these strategies can be monitored and evaluated.

Success plans can be selected, customized, etc. per account, per customer, per type (or account, customer, or the like), etc. A plan can dictate which plays to be applied based on time, condition of the account, etc. Multiple plans can be assigned to an account. For example, each product line can optionally have its own plan. Plan selection for and/or assignment to an account can be based on one or more of time, triggering by metrics or analytics, occurrence of one or more events, etc. In some implementations of the current subject matter, a plan can prompt a CSM representative, manager, etc. to choose an appropriate plan for an account. The choice of an appropriate plan can be based on one or more of what was sold, total value, location, or other useful factors, etc. Multiple plans can be assigned to a single account. In such cases, the multiple plans can be designed to achieve different goals for different indicators. Selection of a specific plan or plans to use for a specific account can be configurable, either manually or dynamically.

The indicators discussed above can be based on an overall health metric, which can be calculated either in whole or in part by one or more analytics engines, which can process data including recurring revenue data from a recurring revenue management system (e.g. as discussed in greater detail in co-owned and co-pending U.S. patent applications US2014/0114709A1, US2014/0122176A1, US2014/0156343A1, US2013/0339088A1, US2014/0122240A1, US2013/0339089A1, US2014/0114818A1, and US2014/0114819A1, the disclosures of which are incorporated herein by reference). Indicators can generate an overall health metric related to one or more factors relevant to the vendor-customer relationship.

In some implementations of the current subject matter, analytics can be run to correlate different aspects of a success plan to the changes in the health metric. In this manner, finer detail can be provided with quantifiable data regarding specific impacts of discrete actions, tasks, plays, or entire success plans on a customer relationship, on customer success, and ultimately, on revenue realizable from a customer. The analytics data and the presentation thereof consistent with the user interface approaches discussed herein can relate both to "snapshot" data and trending data that provide tracking over time of both the values of metrics and the rate of change (and optionally of higher order derivatives of such values). Application of analytics to these indicators can be used to correlate different aspects of a plan to changes in one or more health metrics as well as to use and/or non-use of various plays, success plans, and the like.

Figure 13:
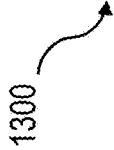
FIG. 13 shows a screenshot view illustrating features of a CSM administrator screen for use in modifying or creating a success plan consistent with implementations of the current subject matter.
Figure 14:
FIG. 14 shows another screenshot view illustrating features of a CSM administrator screen for use in modifying or creating a success plan consistent with implementations of the current subject matter.

FIG. 13 and FIG. 14 show screenshots 1300 and 1400 illustrating features of an account plan template management screen consistent with implementations of the current subject matter. The template can allow a user with administrative access to define one or more features of a success plan, including lifecycle phases (e.g. onboarding, adoption, retention, renewal, etc.), a length (e.g. in days or other time units) of each phase, a set of plays or playbooks to be active within the success plan, and one or more indicators to be displayed to a CSM user when the user view a success plan user interface screen. The indicator definition can include selection of one or more criteria for evaluating a value judgment to be displayed with the numerical value of an indicator. As discussed above, the value judgments, which can include "good," "bad," or other, context specific options can be represented visually to give a CSM user a rapidly understandable way of interpreting the meaning of the various indicators.

FIG. 15 shows a screenshot 1500 illustrating features of an indicator definition administration screen via which a CSM user with administrator access can browse the available indicators and choose which to use on a CSM user screen. Via such an administrator screen, it can also be possible to define display names for use in identifying the indicators on a CSM end user's screen.

Figure 16:
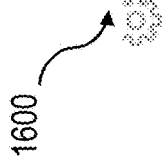
FIG. 16 shows a screenshot view illustrating features of a CSM administrator playbook management screen for use in modifying or creating playbooks consistent with implementations of the current subject matter.
Figure 17:
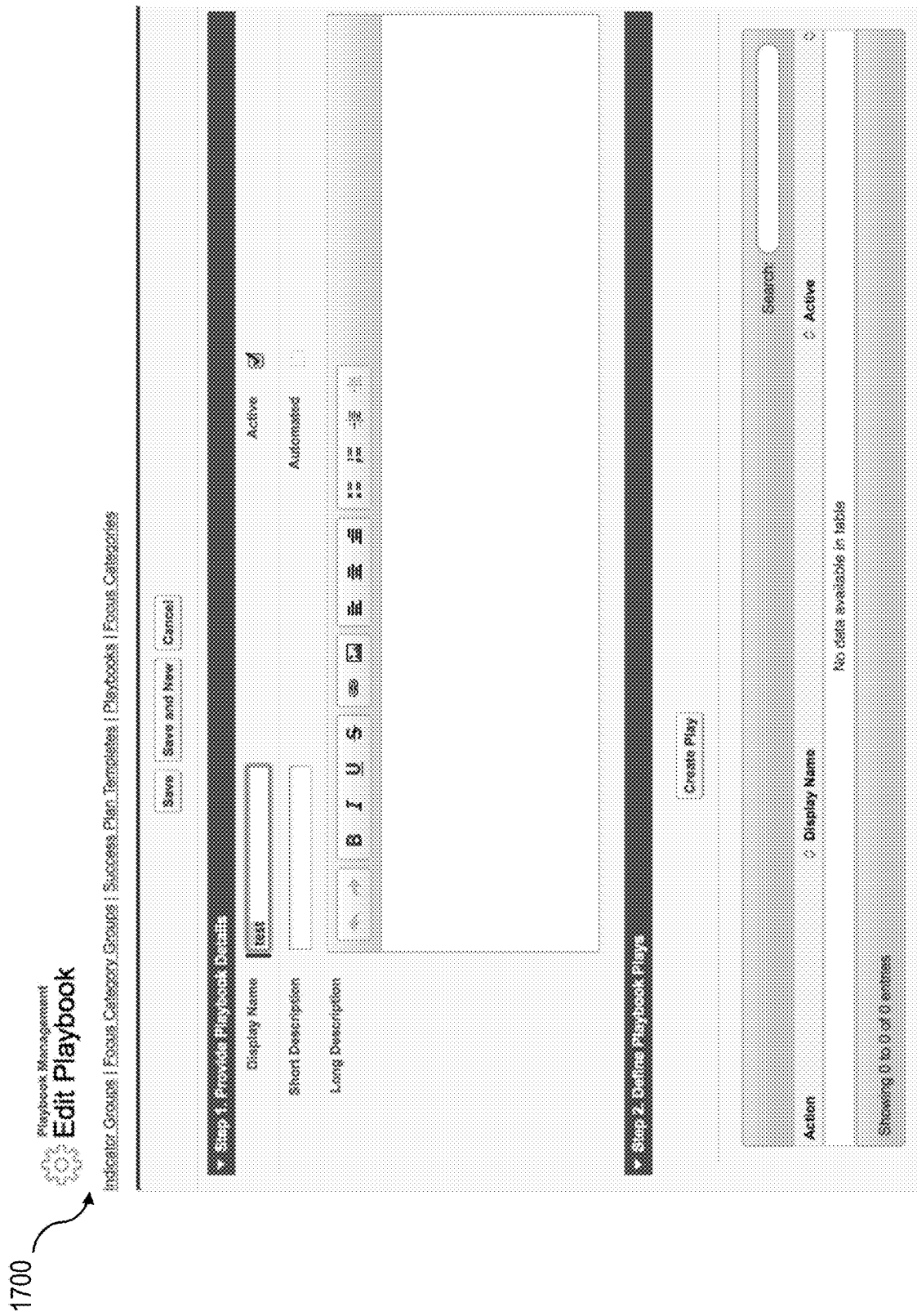
FIG. 17 shows another screenshot view illustrating features of a CSM administrator screen for use in modifying or creating a success plan consistent with implementations of the current subject matter.

FIG. 16 shows a screenshot 1600 illustrating features of an example of a playbook management administration screen via which a CSM user with administrator access can manage available playbooks and create new playbooks for use in success plans. FIG. 17 shows a screenshot 1700 illustrating features of an example of a playbook creation screen, which includes fields for entering a playbook name and descriptions and also for defining the specific tasks to be included in plays within the playbook. Defined playbooks can be used as building blocks for success plans.

As noted above, plays can be triggered by events, which can include detection that an analytical measure has changed by a threshold amount, reached a threshold value, or undergone some defined changed in value, rate of change, or the like. Definition of such triggers as well as other configurations of success plans can be completed via administrator user interface screens consistent with implementations of the current subject matter. For example, in a CSM administration area of a CSM application consistent with the current subject matter, administrators can manage settings for indicator groups, focus categories, success plan templates, playbooks, and the like. The administrator user interface can support creation of new focus categories, addition of action tiles, reordering of columns, setting of criteria, and performance of other functions that control what is displayed on the CSM overview and other CSM pages of the application.

Creation of a trigger can include designating one or more underlying objects, in either or both of a recurring revenue management repository and an analytics engine, with which a play is to be associated. As used herein, a play being associated with an object means that the object provides data useful in determining whether or not to trigger a play and/or an object that is modified by a user competing one or more actions within a play.

Figure 18:
FIG. 18 shows a screenshot view illustrating features of a CSM administrator screen for use in modifying or creating focus categories and focus category groups consistent with implementations of the current subject matter.

FIG. 18 shows a screenshot 1800 illustrating features of a category group administration screen via which a CSM user with administrator access can browse available categories and determine which to display on a CSM user screen. Creation and definition of new categories and category groups can also be accomplished via such screens.

Higher-level administrators, managers, or the like can also control custom settings that determine what is available within the CSM administration screens. For example, the vendor organization can set up a list of possible risk reasons for completing or dismissing CSM tasks. These reasons can populate the risk reason menu when resolving tasks.

Figure 19:
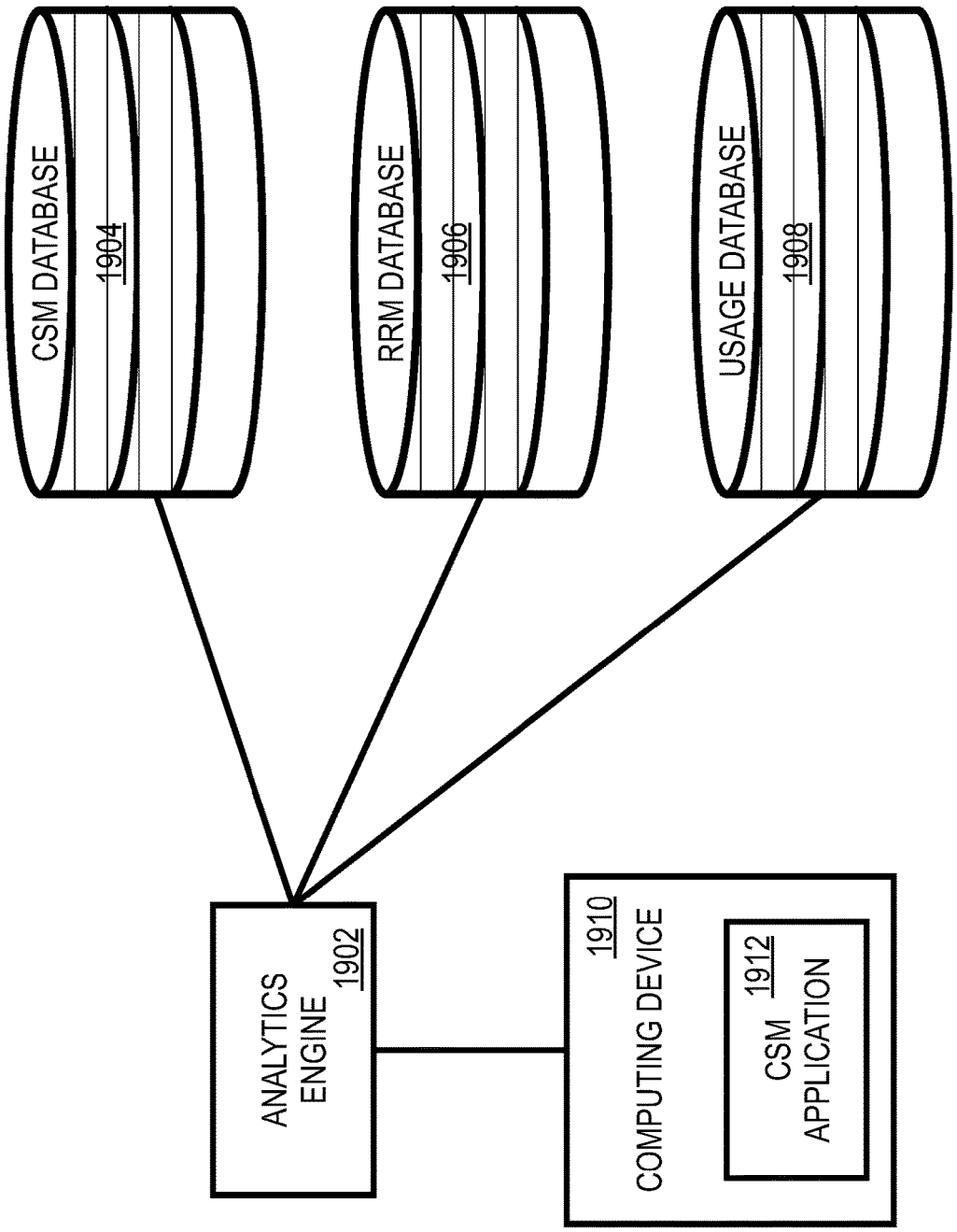
FIG. 19 shows a diagram of a computing architecture illustrating features consistent with implementations of the current subject matter.

FIG. 19 shows a computing architecture diagram illustrating features consistent with at least some implementations of the current subject matter. An analytics engine 1902 can operate as discussed elsewhere herein to aggregate and perform various analytics on data including customer usage or subscription data, recurring revenue management and relationship data, etc. At least some of this data can be captured from and/or stored in one or more of a CSM database 1904, a recurring revenue management database 1906 (sometimes also referred to as a recurring revenue management repository), and a usage database 1908 (e.g. a database or data stream that includes data relating to customer usage of goods and/or services provided by the vendor organization and/or by other vendor organizations. A computing device 1910 (e.g. one or more networked servers or alternatively one or more local machines) can execute a CSM support application 1912 having one or more features discussed herein and can generate various user interface features for relaying information (e.g. information derived from the analytics engine 1902) to and receiving input from CSM users.

Figure 20:
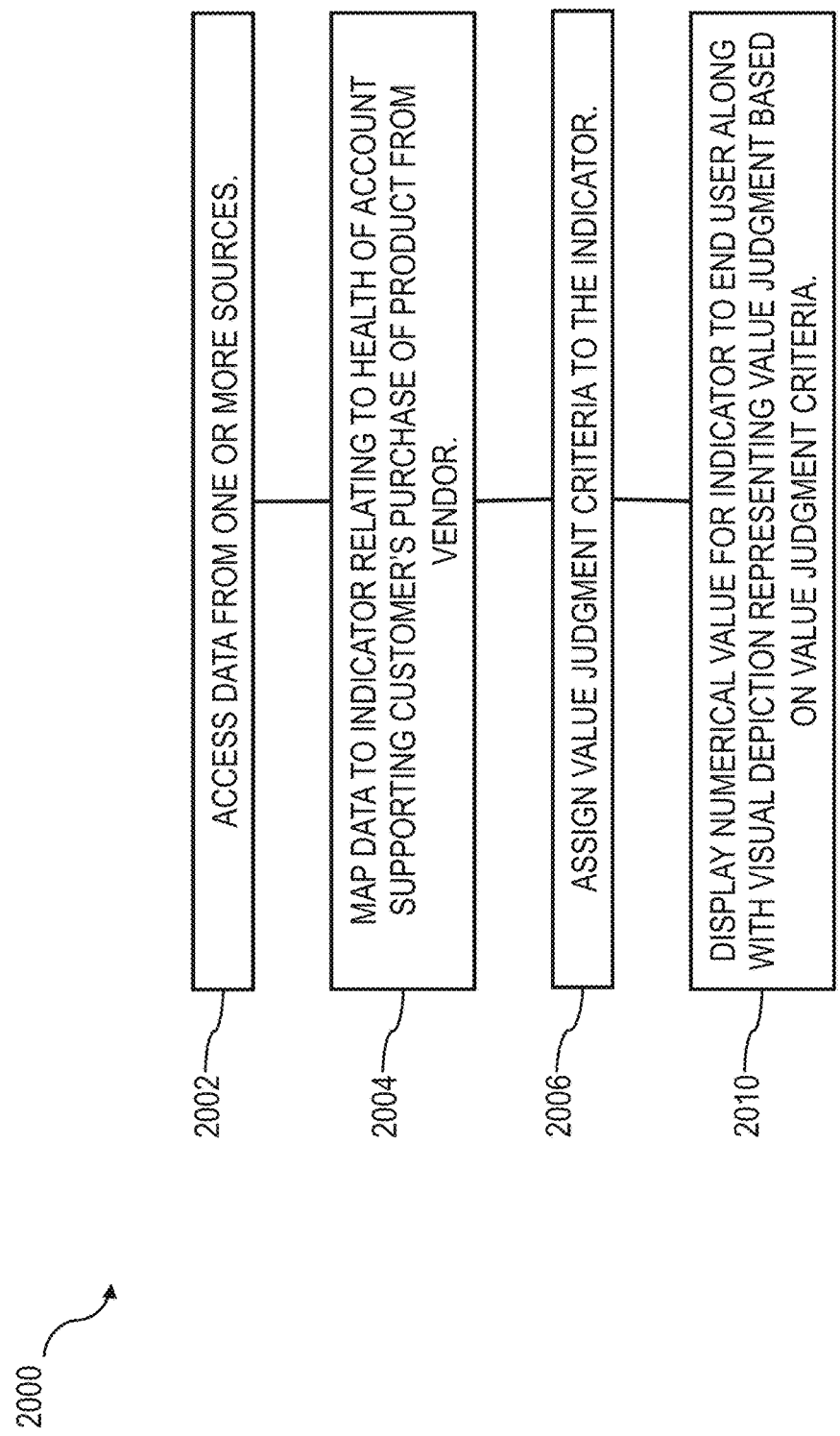
FIG. 20 shows a process flow chart illustrating features of a method consistent with implementations of the current subject matter.

FIG. 20 shows a process flow chart 2000 illustrating features of a method consistent with one or more implementations of the current subject matter. At 2002, an analytics engine accesses data from one or more sources. The data includes usage data indicative of customer usage of at least one product provided by a vendor organization, CSM data relating to customer experiences with the at least one product, and recurring revenue management data relating to the at least one product. As used herein, the term product refers to either or both of a tangible product and a service (e.g. a software subscription and/or other examples of services and products as described throughout the disclosure). At 2004, a machine executing features of a CSM application maps the data to an indicator relating to health of an account supporting the customer's purchase of the at least one product from the vendor. Input received from an administrator at the vendor is used to assign value judgment criteria to the indicator at 2006. The input can include one or more of thresholds, ranges, other mathematical relationships, or the like for determining a state of a value judgment for the indicator based on a current state of the data. The current state of the data can optionally include one or more of current values, current rates of change, delta values (e.g. an amount of change relative to a previous value), and the like. At 2010, a numerical value for the indicator is displayed to an end user along with a visual depiction representing a value judgment based on the value judgment criteria.

Figure 21:
FIG. 21 shows a process flow chart illustrating features of a method consistent with implementations of the current subject matter.

FIG. 21 shows a process flow chart 2100 illustrating features of an additional method consistent with one or more implementations of the current subject matter. At 2102, a plurality of tasks, which are grouped into one or more plays defined for a success plan, are assigned to a user of a CSM application. The success plan is based on a success plan definition associated with at least one phase of a lifecycle of an account associated with a purchase by a customer of at least one recurring revenue product from a vendor. For a task of the plurality of tasks, the user chooses to complete or dismiss the task. An analytical engine receiving data from one or more sources (e.g. e.g. one or more of usage data, CSM data, recurring revenue management data, etc.) analyzes efficacy of the play that includes the task based on the data as well as information about the completion or dismissing of the task into its analysis at 2104. The success plan definition is modified based on the analyzed efficacy of the play at 2106 such that a later instance of the success plan includes at least one modification to the play.

Figure 22:
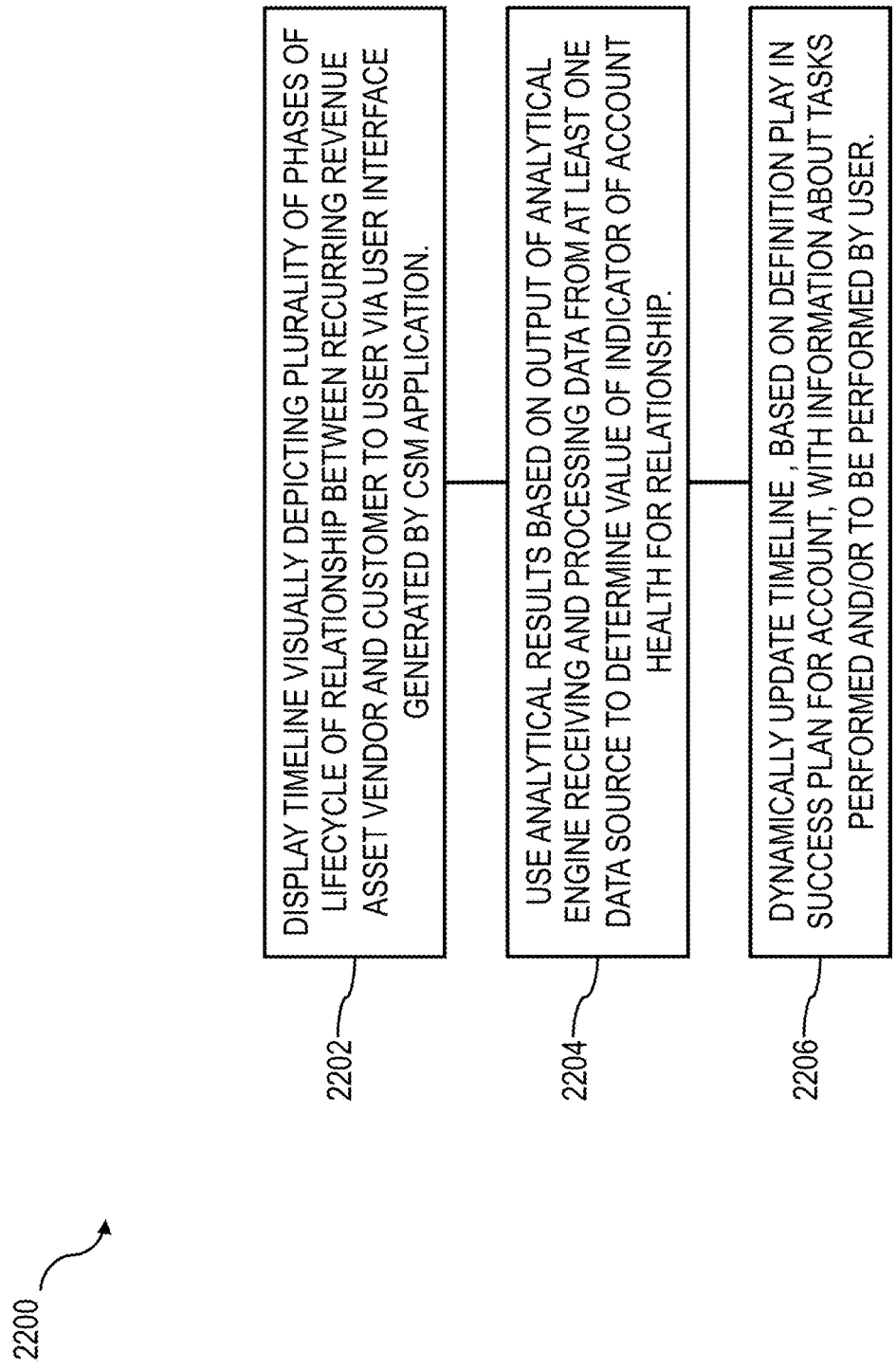
FIG. 22 shows a process flow chart illustrating features of another method consistent with implementations of the current subject matter.

FIG. 22 shows a process flow chart 2200 illustrating features of a method consistent with one or more implementations of the current subject matter. At 2202, a timeline is displayed to a user via a user interface generated by a CSM application executing on one or more machines. The timeline visually depicts a plurality of phases (e.g. one or more of onboarding, adoption, retention, and renewal) of a lifecycle of a relationship between a recurring revenue asset vendor organization and a customer. Analytical results based on output of an analytical engine that receives and processes data from at least one data source (e.g. one or more of usage data, CSM data, recurring revenue management data, etc.) are used at 2204 to determine a value of at least one indicator of account health for the relationship. At 2206, the timeline is dynamically updated with information about tasks performed and/or to be performed by the user of the CSM application. The dynamic updating is based on a definition of at least one play in a success plan for the account. The definition includes a trigger, a threshold, or the like, which is configurable such that a play is triggered upon one or more predefined criteria being met for the at least one indicator. For example, a plurality of icons can be displayed with spacing along the timeline representative of either when the tasks were completed or when the tasks should be completed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for implementation by one or more data processors forming part of at least one computing device, the method comprising the one or more processors:

accessing, by a processor of a revenue management system, from electronic records of one or more data sources, usage data quantifying underlying usage of products and/or services by each of one or more customers associated with each of a plurality of responsible representatives of a vendor organization, the products and/or services provided by the vendor organization to the one or more customers;

mapping, by the processor of the revenue management system, the usage data for each of the one or more customers to an indicator comprising one or more predetermined account health metrics representative of account health of an account of each customer of each responsible representative, the one or more predetermined account health metrics relating to a probability of each customer renewing service or maintenance contracts associated with the products and/or services;

determining, by the processor of the revenue management system, a value judgment for each indicator, the determining comprising comparing a current status of the one or more account health metrics to at least one predetermined value judgment criteria assigned to the indicator;

providing, by the processor of the revenue management system, a first graphical user interface to a computing system for display on a display device, the first graphical user interface comprising a health indicator chart and a visual depiction of a status of the accounts of the one or more customers associated with one or more selected responsible representatives, the visual depiction of the status of the accounts based on the determined value judgements and providing a listing of the accounts and indicating which of the accounts in the listing of the accounts fall within each of a plurality of groupings, the plurality of groupings comprising a healthy group of the accounts, and a plurality of groups of unhealthy accounts;

receiving, by the processor of the revenue management system, a selection of a part of the health indicator chart through the first graphical user interface;

in response to the received selection, providing, by the processor of the revenue management system, a second graphical user interface to the computing system for display on the display device, the second graphical interface comprising a drill down display providing a listing of one or more tasks related to one or more accounts corresponding to the selected part of the health indicator chart, information about each of the one or more accounts corresponding to the selected part of the health indicator chart, contact information for each of the one or more accounts corresponding to the selected part of the health indicator chart, and a selected playbook directed to improving the health metrics for the one or more accounts corresponding to the selected part of the health indicator chart, the selected playbook comprising a plurality of stages of a renewal sales process, one or more of the plurality of stages further comprising one or more sub-stages, each stage and sub-stage comprising a configurable plurality of suggested actions for each of the one or more accounts corresponding to the selected part of the health indicator chart, wherein the selected playbook is selected from a plurality of playbooks based on the health metrics for the one or more accounts corresponding to the selected part of the health indicator chart and wherein the second graphical user interface indicates a sequence of one or more suggested future actions to be performed by the user in association with the renewal sales opportunity, the sequence of one or more suggested future actions being defined by the playbook based on a current context of one or more data object instances associated with the renewal sales opportunity, wherein the current context of the one or more data object instances is based on completed actions in the sequence of actions in each stage and sub-stage of the selected playbook; and grouping, by the processor, the selected playbook and one or more additional playbooks of the plurality of playbooks into a success plan for the one or more accounts corresponding to the selected part of the health indicator chart.

2. The computer-implemented method as in claim 1, wherein the usage data includes at least one of data relating to customer experience with the product, and recurring revenue management data.

3. The computer-implemented method as in claim 1, wherein the visual depiction further comprises a numerical value of the indicator, the numerical value being directly provided by an analytics engine based on customer service management data from a customer service management database and/or calculated based on one or more values provided by the analytics engine.

4. The computer-implemented method as in claim 1, further comprising receiving configuration inputs from the administrator, the configuration inputs causing configuration of an account plan management screen displayed in a third graphical user interface, the account plan management screen comprising the visual depiction.

5. The computer-implemented method as in claim 4, wherein the third graphical user interface further comprises an account timeline, the account timeline including timeline elements associated with significant events associated with at least one of the accounts corresponding to the selected part of the health indicator chart and wherein the account timeline is dynamically updated based on completion of the suggested actions in the selected playbook and the one or more additional playbooks of the success plan for the one or more accounts corresponding to the selected part of the health indicator chart.

6. The computer-implemented method as in claim 5, wherein the account timeline includes a visual display of phases of an account lifecycle.

7. The computer-implemented method as in claim 1, wherein the one or more account health metrics are based on historical use data from other customers and are selected based on other customers having one or more characteristics similar to the one or more customers.

8. The computer-implemented method as in claim 1, wherein the visual depiction comprises an account health chart providing a snapshot view of the status of the one or more account health metrics.

9. The computer-implemented method as in claim 1, wherein the visual depiction comprises an action section comprising icons relating to key information associated with the accounts.

10. The computer-implemented method as in claim 1, wherein the plurality of groups of accounts comprise a low adoption group and a pending churn group.

11. A system comprising:

a processor; and a memory coupled with and readable by the processor and storing therein a set of instructions which, when executed by the processor, causes the processor to:

access, from electronic record of one or more data sources, usage data quantifying underlying usage of products and/or services by each of one or more customers associated with each of a plurality of responsible representatives of a vendor organization, the products and/or services provided by the vendor organization to the one or more customers;

map the usage data for each of the one or more customers to an indicator comprising one or more predetermined account health metrics representative of account health of an account of each customer of each responsible representative, the one or more predetermined account health metrics relating to a probability of each customer renewing service or maintenance contracts associated with the products and/or services;

determine a value judgment for each indicator, the determining comprising comparing a current status of the one or more account health metrics to at least one predetermined value judgment criteria assigned to the indicator;

provide a first graphical user interface to a computing system for display on a display device, the first graphical user interface comprising a health indicator chart and a visual depiction of a status of the accounts of the one or more customers associated with one or more selected responsible representatives, the visual depiction of the status of the accounts based on the determined value judgements and providing a listing of the accounts and indicating which of the accounts in the listing of the accounts fall within each of a plurality of groupings, the plurality of groupings comprising a healthy group of the accounts, and a plurality of groups of unhealthy accounts;

receive a selection of a part of the health indicator chart through the first graphical user interface;

in response to the received selection, provide a second graphical user interface to the computing system for display on the display device, the second graphical interface comprising a drill down display providing a listing of one or more tasks related to one or more accounts corresponding to the selected part of the health indicator chart, information about each of the one or more accounts corresponding to the selected part of the health indicator chart, contact information for each of the one or more accounts corresponding to the selected part of the health indicator chart, and a selected playbook directed to improving the health metrics for the one or more accounts corresponding to the selected part of the health indicator chart, the selected playbook comprising a plurality of stages of a renewal sales process, one or more of the plurality of stages further comprising one or more sub-stages, each stage and sub-stage comprising a configurable plurality of suggested actions for each of the one or more accounts corresponding to the selected part of the health indicator chart, wherein the selected playbook is selected from a plurality of playbooks based on the health metrics for the one or more accounts corresponding to the selected part of the health indicator chart and wherein the second graphical user interface indicates a sequence of one or more suggested future actions to be performed by the user in association with the renewal sales opportunity, the sequence of one or more suggested future actions being defined by the playbook based on a current context of one or more data object instances associated with the renewal sales opportunity, wherein the current context of the one or more data object instances is based on completed actions in the sequence of actions in each stage and sub-stage of the selected playbook; and grouping the selected playbook and one or more additional playbooks of the plurality of playbooks into a success plan for the one or more accounts corresponding to the selected part of the health indicator chart.

12. The system of claim 11, wherein the usage data includes at least one of data relating to customer experience with the product, and recurring revenue management data.

13. The system of claim 11, wherein the visual depiction further comprises a numerical value of the indicator, the numerical value being directly provided by an analytics engine based on customer service management data from a customer service management database and/or calculated based on one or more values provided by the analytics engine.

14. The system of claim 11, wherein the instructions further cause the processor to receive configuration inputs from the administrator, the configuration inputs causing configuration of an account plan management screen displayed in a third graphical user interface, the account plan management screen comprising the visual depiction.

15. The system of claim 14, wherein the graphical user interface further comprises an account timeline, the account timeline including timeline elements associated with significant events associated with at least one of the accounts corresponding to the selected part of the health indicator chart, wherein the account timeline is dynamically updated based on completion of the suggested actions in the selected playbook and the one or more additional playbooks of the success plan for the one or more accounts corresponding to the selected part of the health indicator chart, and wherein the account timeline includes a visual display of phases of an account lifecycle.

16. The system of claim 11, wherein the one or more account health metrics are based on historical use data from other customers and are selected based on other customers having one or more characteristics similar to the one or more customers.

17. A non-transitory, computer-readable medium comprising a set of instructions stored therein which, when executed by a processor, causes the processor to:

access, from electronic record of one or more data sources, usage data quantifying underlying usage of products and/or services by each of one or more customers associated with each of a plurality of responsible representatives of a vendor organization, the products and/or services provided by the vendor organization to the one or more customers;

map the usage data for each of the one or more customers to an indicator comprising one or more predetermined account health metrics representative of account health of an account of each customer of each responsible representative, the one or more predetermined account health metrics relating to a probability of each customer renewing service or maintenance contracts associated with the products and/or services;

determine a value judgment for each indicator, the determining comprising comparing a current status of the one or more account health metrics to at least one predetermined value judgment criteria;

provide a first graphical user interface to a computing system for display on a display device, the first graphical user interface comprising a health indicator chart and a visual depiction of a status of the accounts of the one or more customers associated with one or more selected responsible representatives, the visual depiction of the status of the accounts based on the determined value judgements and providing a listing of the accounts and indicating which of the accounts in the listing of the accounts fall within each of a plurality of groupings, the plurality of groupings comprising a healthy group of the accounts, and a plurality of groups of unhealthy accounts;

receive a selection of a part of the health indicator chart through the first graphical user interface;

in response to the received selection, provide a second graphical user interface to the computing system for display on the display device, the second graphical interface comprising a drill down display providing a listing of one or more tasks related to one or more accounts corresponding to the selected part of the health indicator chart, information about each of the one or more accounts corresponding to the selected part of the health indicator chart, contact information for each of the one or more accounts corresponding to the selected part of the health indicator chart, and a selected playbook directed to improving the health metrics for the one or more accounts corresponding to the selected part of the health indicator chart, the selected playbook comprising a plurality of stages of a renewal sales process, one or more of the plurality of stages further comprising one or more sub-stages, each stage and sub-stage comprising a configurable plurality of suggested actions for each of the one or more accounts corresponding to the selected part of the health indicator chart, wherein the selected playbook is selected from a plurality of playbooks based on the health metrics for the one or more accounts corresponding to the selected part of the health indicator chart and wherein the second graphical user interface indicates a sequence of one or more suggested future actions to be performed by the user in association with the renewal sales opportunity, the sequence of one or more suggested future actions being defined by the playbook based on a current context of one or more data object instances associated with the renewal sales opportunity, wherein the current context of the one or more data object instances is based on completed actions in the sequence of actions in each stage and sub-stage of the selected playbook; and group the selected playbook and one or more additional playbooks of the plurality of playbooks into a success plan for the one or more accounts corresponding to the selected part of the health indicator chart.

* * * * *